United States Patent
Goodchild et al.

(10) Patent No.: US 11,894,700 B2
(45) Date of Patent: *Feb. 6, 2024

(54) DYNAMIC INFERRED COUPLING ESTIMATION

(71) Applicant: AIRA, INC., Chandler, AZ (US)

(72) Inventors: Eric Heindel Goodchild, Phoenix, AZ (US); John Winters, Chandler, AZ (US)

(73) Assignee: AIRA, INC., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,313

(22) Filed: Sep. 26, 2022

(65) Prior Publication Data

US 2023/0231423 A1 Jul. 20, 2023

Related U.S. Application Data

(63) Continuation of application No. 16/936,356, filed on Jul. 22, 2020, now Pat. No. 11,456,628.

(60) Provisional application No. 62/877,831, filed on Jul. 23, 2019.

(51) Int. Cl.
| | |
|---|---|
| *H02J 50/90* | (2016.01) |
| *H02J 7/00* | (2006.01) |
| *H02J 50/80* | (2016.01) |
| *H02J 50/12* | (2016.01) |

(52) U.S. Cl.
CPC .......... *H02J 50/90* (2016.02); *H02J 7/00712* (2020.01); *H02J 50/12* (2016.02); *H02J 50/80* (2016.02)

(58) Field of Classification Search
CPC .......................................................... H02J 50/90
USPC .......................................................... 320/108
See application file for complete search history.

(56) References Cited

U.S. PATENT DOCUMENTS

| | | | |
|---|---|---|---|
| 2010/0259217 A1 | 10/2010 | Baarman et al. | |
| 2013/0063083 A1 | 3/2013 | Park et al. | |
| 2014/0339908 A1 | 11/2014 | Omae et al. | |
| 2016/0134154 A1* | 5/2016 | Baarman ............... | H02J 7/0036 320/108 |
| 2018/0226815 A1* | 8/2018 | Yamanishi ............ | H02J 7/0042 |

* cited by examiner

*Primary Examiner* — Edward Tso
*Assistant Examiner* — Ahmed H Omar
(74) *Attorney, Agent, or Firm* — Anthony G. Smyth; LOZA & LOZA, LLP

(57) ABSTRACT

Systems, methods and apparatus for providing a wireless charging device are disclosed. A method for operating the wireless charging device includes transmitting a first pulse through each of a plurality of charging circuits, determining peak voltage at nodes in the plurality of charging circuits, each node coupling a transmitting coil to a capacitor in one charging circuit in the plurality of charging circuits, the peak voltage at each node being responsive to the first pulse and indicative of a coupling coefficient with a receiving coil in a chargeable device, determining that a minimum peak voltage responsive to the first pulse is associated with a first charging circuit in the plurality of charging circuits, and providing a first charging current to the first charging circuit.

16 Claims, 18 Drawing Sheets

1200

| Rx Load 100mA | | |
|---|---|---|
| Spacer (mm) | Iin (A) | Vpk (V) |
| 0 | 0.230 | 8.107 |
| 2 | 0.303 | 10.617 |
| 3 | 0.313 | 10.960 |
| 4.5 | 0.382 | 13.027 |
| 6 | 0.521 | 15.853 |
| 9 | 0.886 | 21.250 |

1220

| Rx Load 0mA | | |
|---|---|---|
| Spacer (mm) | Iin (A) | Vpk (V) |
| 0 | 0.129 | 8.882 |
| 2 | 0.178 | 10.973 |
| 3 | 0.220 | 12.250 |
| 4.5 | 0.267 | 13.490 |
| 6 | 0.377 | 15.623 |
| 9 | 0.710 | 20.723 |

1240

| Rx Load 250mA | | |
|---|---|---|
| Spacer (mm) | Iin (A) | Vpk (V) |
| 0 | 0.386 | 7.308 |
| 2 | 0.469 | 11.197 |
| 3 | 0.462 | 10.707 |
| 4.5 | 0.533 | 13.050 |
| 6 | 0.602 | 14.477 |
| 9 | 0.957 | 20.063 |

*FIG. 12*

DYNAMIC INFERRED COUPLING ESTIMATION

PRIORITY CLAIM

This application is a continuation of non-provisional patent application Ser. No. 16/936,356 filed in the United States Patent Office on Jul. 22, 2020, which claims priority to and the benefit of provisional patent application No. 62/877,831 filed in the United States Patent Office on Jul. 23, 2019, the entire content of these applications being incorporated herein by reference as if fully set forth below in their entirety and for all applicable purposes.

TECHNICAL FIELD

The present invention relates generally to wireless charging of batteries, including batteries in mobile computing devices, and more particularly to detection of device location prior to a charging operation and relocations during the charging operation.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Improvements in wireless charging capabilities are required to support continually increasing complexity of mobile devices and changing form factors. For example, there is a need for a faster, lower power detection techniques that can locate a chargeable device placed on a charging surface of a charging device, and relocation of the chargeable device during a charging operation.

BRIEF DESCRIPTION OF THE DRAWINGS

FIG. 12 illustrates the effect of coupling on voltage measured at a node of the transmitter in a wireless charging system in accordance with certain aspects disclosed herein.

DETAILED DESCRIPTION

Figure 1:
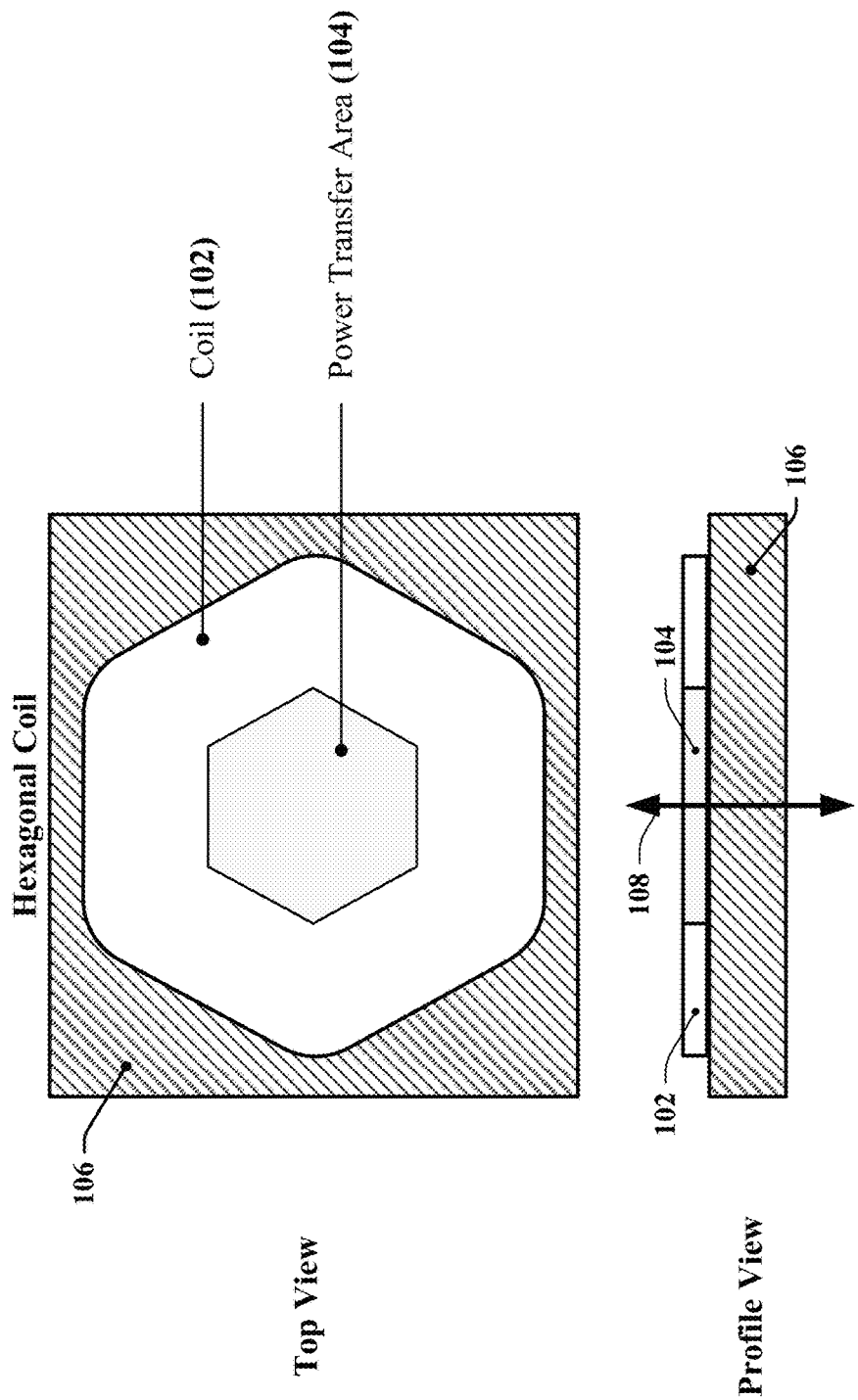
FIG. 1 illustrates an example of a charging cell that may be employed to provide a charging surface in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices and techniques. Charging cells may be configured with one or more inductive coils to provide a charging device that can charge one or more devices wirelessly. The location of a device to be charged may be detected through sensing techniques that associate location of a device to changes in a physical characteristic centered at a known location on a surface of the charging device. Sensing of location may be implemented using capacitive, resistive, inductive, touch, pressure, load, strain, and/or another appropriate type of sensing.

In one aspect of the disclosure, an apparatus has a battery charging power source, a plurality of charging cells configured in a matrix, a first plurality of switches in which each switch is configured to couple a row of power transmitting coils in the matrix to a first terminal of the battery charging power source, and a second plurality of switches in which each switch is configured to couple a column of power transmitting coils in the matrix to a second terminal of the battery charging power source. Each charging cell in the plurality of charging cells may include one or more coils surrounding a power transfer area. The plurality of power transmitting charging cells may be arranged adjacent to a charging surface without overlap of power transfer areas of the charging cells in the plurality of charging cells. In some examples, each power transmitting coil may be directly driven by a driver circuit.

Certain aspects of the present disclosure relate to systems, apparatus and methods for wireless charging. In one example, each charging circuit in a plurality of charging circuits includes a power transmitting coil and a capacitor coupled at a node. One or more driver circuits are configurable to provide a charging current to one or more charging circuits in the plurality of charging circuits. A controller may be configured to cause a first pulse to be transmitted through each of the plurality of charging circuits, determine peak voltage at each of the nodes in the plurality of charging circuits, the peak voltage at each node being responsive to the first pulse and indicative of a coupling coefficient with a receiving coil in a chargeable device, determine that a minimum peak voltage responsive to the first pulse is associated with a first charging circuit in the plurality of charging circuits, and configure the driver circuit to provide a first charging current to the first charging circuit.

Charging Cells

According to certain aspects disclosed herein, a charging device may be provided using charging cells that are deployed adjacent to a surface of the charging device. In one example the charging cells are deployed in accordance with a honeycomb packaging configuration. A charging cell may be implemented using one or more coils that can each induce a magnetic field along an axis that is substantially orthogonal to the surface of the charging device and adjacent to the coil. In this description, a charging cell may refer to an element having one or more coils where each coil is configured to produce an electromagnetic field that is additive with respect to the fields produced by other coils in the charging cell, and directed along or proximate to a common axis.

In some implementations, a charging cell includes coils that are stacked along a common axis and/or that overlap such that they contribute to an induced magnetic field substantially orthogonal to the surface of the charging device. In some implementations, a charging cell includes coils that are arranged within a defined portion of the surface of the charging device and that contribute to an induced magnetic field within the substantially orthogonal portion of the surface of the charging device associated with the charging cell. In some implementations, charging cells may be configurable by providing an activating current to coils that are included in a dynamically-defined charging cell. For example, a charging device may include multiple stacks of coils deployed across a surface of the charging device, and the charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils. The coils may be referred to herein as charging coils, wireless charging coils, transmitter coils, transmitting coils, power transmitting coils, power transmitter coils, or the like.

FIG. 1 illustrates an example of a charging cell 100 that may be deployed and/or configured to provide a charging device. In this example, the charging cell 100 has a substantially hexagonal shape that encloses one or more coils 102 constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations may provide coils 102 that have other shapes. The shape of the coils 102 may be determined at least in part by the capabilities or limitations of fabrication technology, and/or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
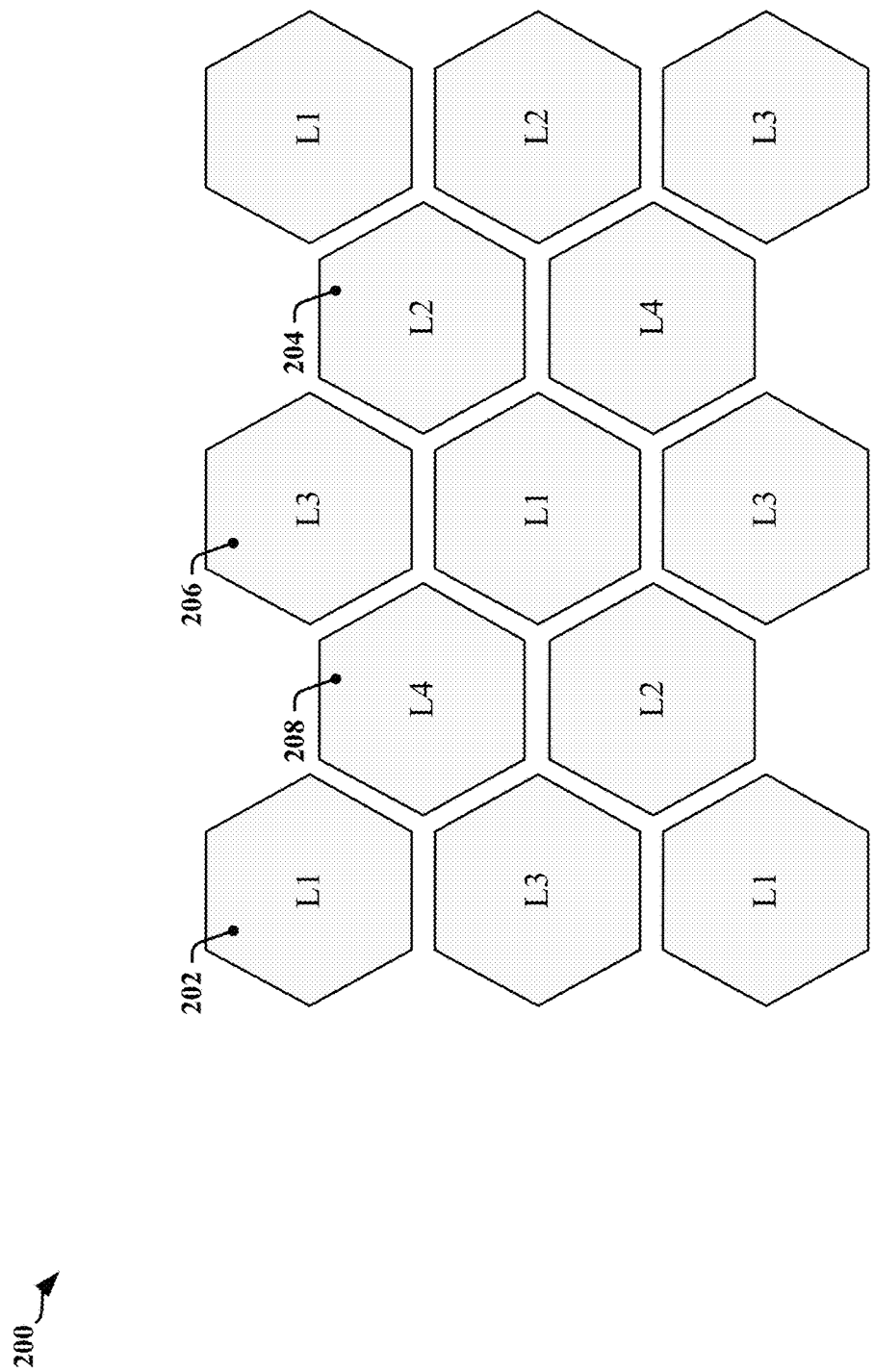
FIG. 2 illustrates the arrangement of power transfer areas provided by a charging surface that employs multiple layers of charging cells configured in accordance with certain aspects disclosed herein.

FIG. 2 illustrates the arrangement of power transfer areas provided across a surface 200 of the charging device that employs multiple layers of charging cells configured in accordance with certain aspects disclosed herein. The charging device may be constructed from four layers of charging cells 202, 204, 206, 208. In FIG. 2, each power transfer area provided by a charging cell in the first layer of charging cells 202 is marked "L1", each power transfer area provided by a charging cell in the second layer of charging cells 204 is marked "L2", each power transfer area provided by a charging cell in the third layer of charging cells 206 is marked "L3", and each power transfer area provided by a charging cell in the fourth layer of charging cells 208 is marked "L4".

Figure 3:
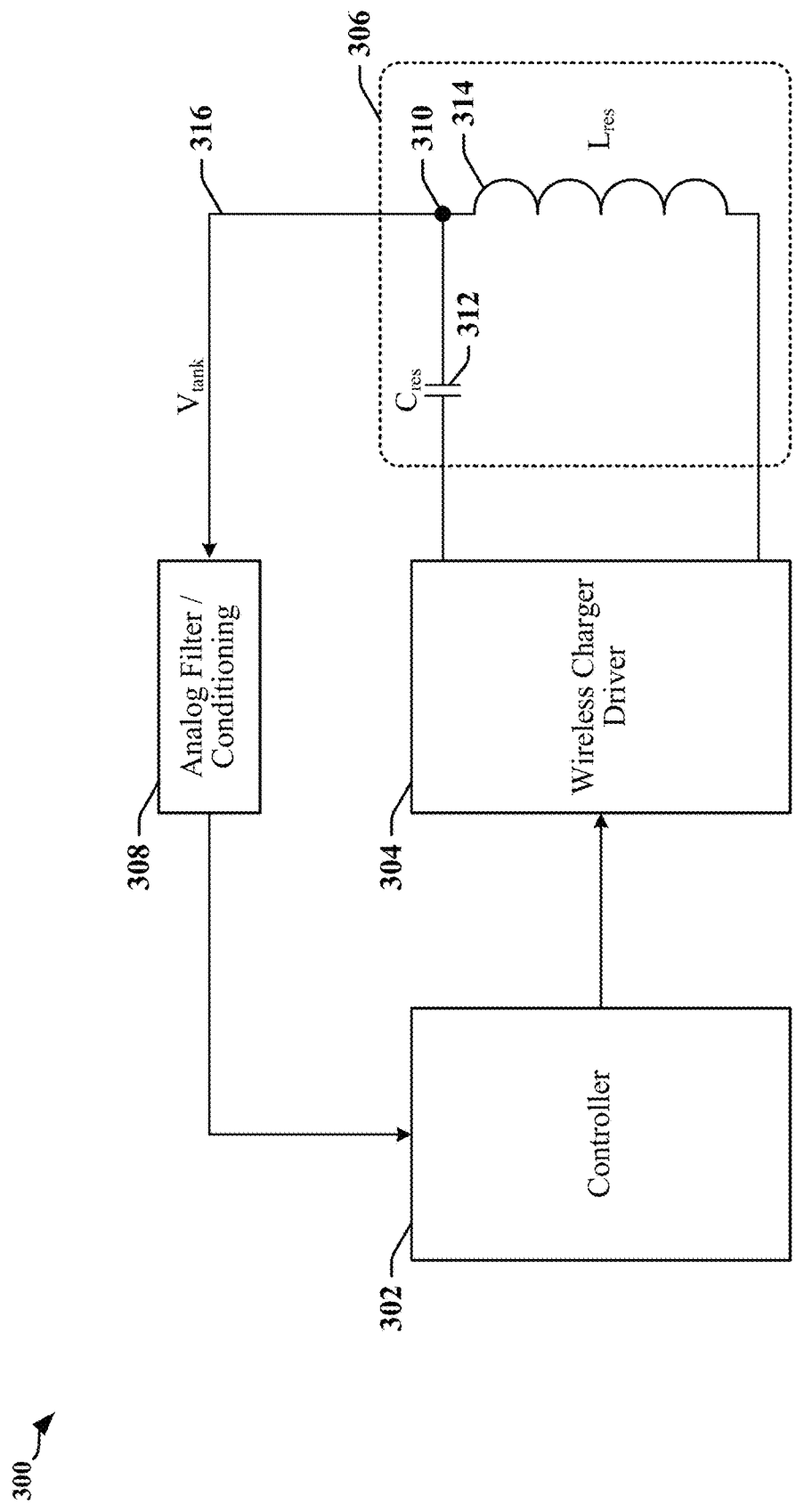
FIG. 3 illustrates a wireless transmitter that may be provided in a charger base station in accordance with certain aspects disclosed herein.

FIG. 3 illustrates a wireless transmitter 300 that may be provided in a charger base station. A controller 302 may receive a feedback signal filtered or otherwise processed by a filter circuit 308. The controller may control the operation of a driver circuit 304 that provides an AC signal to a resonant circuit 306 that includes a capacitor 312 and inductor 314. The resonant circuit 306 may also be referred to herein as a tank circuit, an LC tank circuit and/or as an LC tank, and the voltage 316 measured at an LC node 310 of the resonant circuit 306 may be referred to as the tank voltage.

The wireless transmitter 300 may be used by a charging device to determine if a compatible device has been placed on a surface of the charging device. For example, the charging device may determine that a compatible device has been placed on the surface of the charging device by sending an intermittent test signal (active ping) through the wireless transmitter 300, where the resonant circuit 306 may receive encoded signals when a compatible device responds to the test signal. The charging device may be configured to activate one or more coils in at least one charging cell after receiving a response signal defined by standard, convention, manufacturer or application. In some examples, the compatible device can respond to a ping by communicating received signal strength such that the charging device can find an optimal charging cell to be used for charging the compatible device.

In accordance with certain aspects disclosed herein, a charging device may use one or more location sensing techniques to detect placement or movement of objects on a surface of the charging device. In certain examples, location sensing techniques rely on changes in some property of the electrical conductors that form coils in a charging cell. Measurable differences in properties of the electrical conductors may include capacitance, resistance, inductance and/or temperature. In some examples, loading of a surface of the charging device can affect the measurable resistance of a coil located near the point of loading. In some implementations, sensors may be provided to enable location sensing through detection of changes in touch, pressure, load and/or strain.

A controller in the charging device may attempt to determine the nature of the object. When the controller determines that the object is a chargeable, the controller may attempt to identify the chargeable device and the capabilities of the chargeable device.

The controller may determine a charging configuration that may be used to charge the chargeable device, including one or more coils to receive corresponding charging currents, and the magnitude, frequency and phase of each charging current. In one example, the controller may initiate a digital ping procedure to identify a charging cell, a combination of charging cells and/or a combination of coils that are to be activated to charge the device placed on the charging surface. The digital ping procedure verifies that the device to be charged is compatible with the charging device, and may identify a signal strength indicating whether the coils used to transmit the digital ping are best positioned for the requested or desired charging procedure.

Significant power savings can be achieved when a search is conducted to locate a device placed on or near in a multi-coil, free position charging pad before using digital pings to establish that the device is configured to receive charge from a wireless charging device. The savings in power consumption can be obtained by refraining from providing digital pings until a device is detected in a search, and by limiting digital ping transmissions to transmitting coils that are placed in proximity to the detected device and likely to be capable of establishing an electromagnetic charging connection with the detected device.

Wireless charging devices may be adapted in accordance with certain aspects disclosed herein to support a low-power discovery technique that can replace and/or supplement conventional ping transmissions. A conventional ping is produced by driving a resonant LC circuit that includes a transmitting coil of a base station. The base station then waits for an ASK-modulated response from the receiving device. A low-power discovery technique may include utilizing a passive ping to provide fast and/or low-power discovery. According to certain aspects, a passive ping may be produced by driving a network that includes the resonant LC circuit with a pulse that includes a small amount of energy. The pulse may be provided using an alternating current (AC) voltage or current. In some implementations, the pulse has a duration that is less than the period of the voltage or current used to excite the resonant LC circuit. In one example, the fast pulse may have a duration corresponding to a half cycle of the resonant frequency of the network and/or the resonant LC circuit. In some implementations, the pulse includes multiple cycles of the voltage or current used to excite the resonant LC circuit. The pulse causes the network to oscillate at its natural resonant frequency until the injected energy decays and is dissipated. When the base station is configured for wireless transmission of power within the frequency range 100 kHz to 200 kHz, the fast pulse may have a duration that is less than 2.5 µs.

The passive ping may be characterized and/or configured based on the natural frequency at which the network including the resonant LC circuit rings, and the rate of decay of energy in the network. The ringing frequency of the network and/or resonant LC circuit may be defined as:

$$\omega = \frac{1}{\sqrt{LC}} \qquad \text{(Eq. 1)}$$

The rate of decay is controlled by the quality factor (Q factor) of the oscillator network, as defined by:

$$Q = \frac{1}{R}\sqrt{\frac{L}{C}} \qquad \text{(Eq. 2)}$$

Equations 1 and 2 show that resonant frequency is affected by L and C, while the Q factor is affected by L, C and R. In a base station provided in accordance with certain aspects disclosed herein, the wireless driver has a fixed value of C determined by the selection of the resonant capacitor. The values of L and R are determined by the wireless transmitting coil and by an object or device placed adjacent to the wireless transmitting coil.

The wireless transmitting coil is configured to be magnetically coupled with a receiving coil in a device placed within close proximity of the transmitting coil, and to couple some of its energy into the proximate device to be charged. The L and R values of the transmitter circuit can be affected by the characteristics of the device to be charged, and/or other objects within close proximity of the transmitting coil. As an example, if a piece of ferrous material with a high magnetic permeability placed near the transmitter coils can increase the total inductance (L) of the transmitter coil, resulting in a lower resonant frequency, as shown by Equation 1. Some energy may be lost through heating of materials due to eddy current induction, and these losses may be characterized as an increase the value of R thereby lowering the Q factor, as shown by Equation 2.

A wireless receiver placed in close proximity to the transmitter coil can also affect the Q factor and resonant frequency. The receiver may include a tuned LC network with a high Q which can result in the transmitter coil having a lower Q factor. The resonant frequency of the transmitter coil may be reduced due to the addition of the magnetic material in the receiver, which is now part of the total magnetic system. Table 1 illustrates certain effects attributable to different types of objects placed within close proximity to the transmitter coil.

TABLE 1

| Object | L | R | Q | Frequency |
| --- | --- | --- | --- | --- |
| None present | Base Value | Base value | Base Value (High) | Base Value |
| Ferrous | Small Increase | Large Increase | Large Decrease | Small Decrease |
| Non-ferrous | Small Decrease | Large Increase | Large Decrease | Small Increase |
| Wireless Receiver | Large Increase | Small Decrease | Small Decrease | Large Decrease |

In the example illustrated in FIG. 3, passive ping techniques may use the voltage and/or current measured or observed at the LC node 310 to identify the presence of a receiving coil in proximity to the charging pad of a device adapted in accordance with certain aspects disclosed herein. In many conventional wireless charger transmitters, circuits are provided to measure voltage at the LC node 310 or the current in the network. These voltages and currents may be monitored for power regulation purposes and/or to support communication between devices. A response of the resonant circuit 306 to a passive ping (initial voltage $V_0$) may be represented by the voltage ($V_{LC}$) at the LC node 310, such that:

$$V_{LC} = V_0 e^{-\left(\frac{\omega}{2Q}\right)t} \qquad \text{(Eq. 3)}$$

According to certain aspects disclosed herein, coils in one or more charging cells may be selectively activated to provide an optimal electromagnetic field for charging a compatible device. In some instances, coils may be assigned to charging cells, and some charging cells may overlap other charging cells. In the latter instances, the optimal charging configuration may be selected at the charging cell level. In other instances, charging cells may be defined based on placement of a device to be charged on a surface of the charging device. In these other instances, the combination of coils activated for each charging event can vary. In some implementations, a charging device may include a driver circuit that can select one or more cells and/or one or more predefined charging cells for activation during a charging event.

Figure 4:
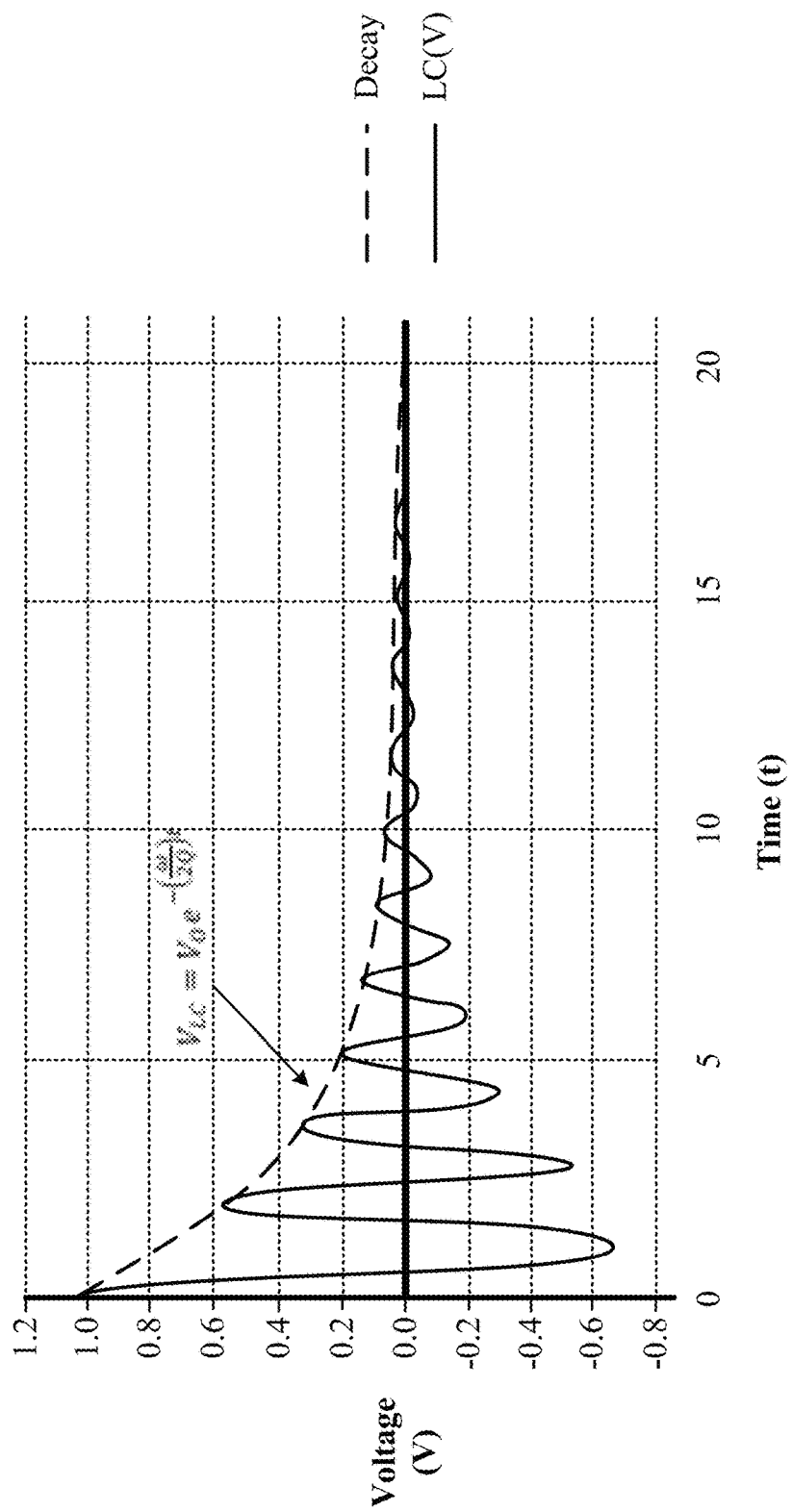
FIG. 4 illustrates a first example of a response to a passive ping in accordance with certain aspects disclosed herein.

FIG. 4 illustrates a first example in which a response 400 to a passive ping decays according to Equation 3. After the excitation pulse at time t=0, the voltage and/or current is seen to oscillate at the resonant frequency defined by Equation 1, and with a decay rate defined by Equation 3. The first cycle of oscillation begins at voltage level $V_0$ and $V_{LC}$ continues to decay to zero as controlled by the Q factor and $\omega$. The example illustrated in FIG. 4 represents a typical open or unloaded response when no object is present or proximate to the charging pad. In FIG. 4 the value of the Q factor is assumed to be 20.

Figure 5:
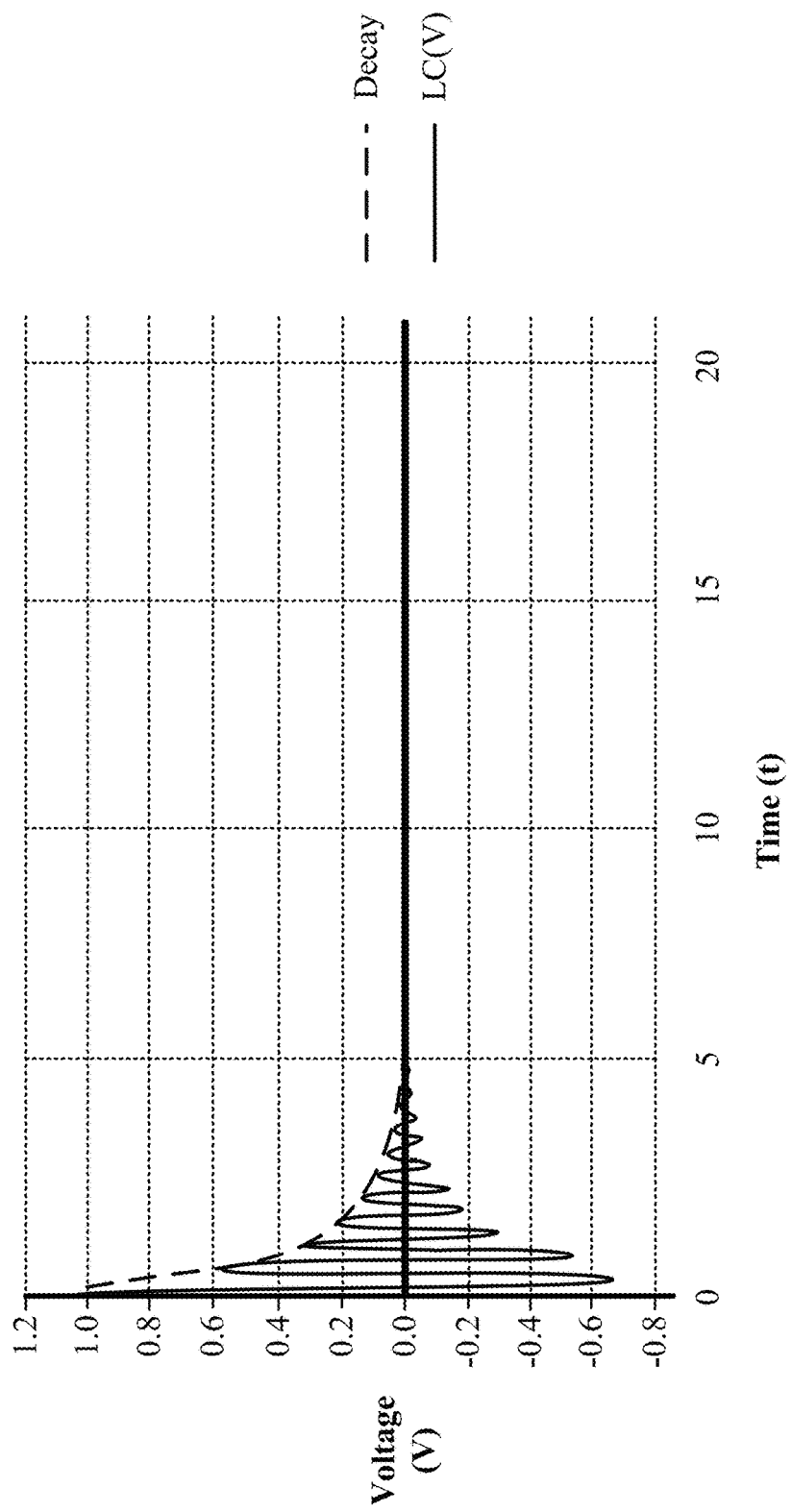
FIG. 5 illustrates a second example of a response to a passive ping in accordance with certain aspects disclosed herein.

FIG. 5 illustrates a second example in which a response 500 to a passive ping decays according to Equation 3. After the excitation pulse at time=0, the voltage and/or current is seen to oscillate at the resonant frequency defined by Equation 1, and with a decay rate defined by Equation 3. The first cycle of oscillation begins at voltage level $V_0$ and $V_{LC}$ continues to decay to zero as controlled by the Q factor and $\omega$. The example illustrated in FIG. 5 represents a loaded response when an object is present or proximate to the charging pad loads the coil. In FIG. 5 the Q factor may have a value of 7. $V_{LC}$ oscillates at a higher in the response 500 with respect to the response 400.

Figure 6:
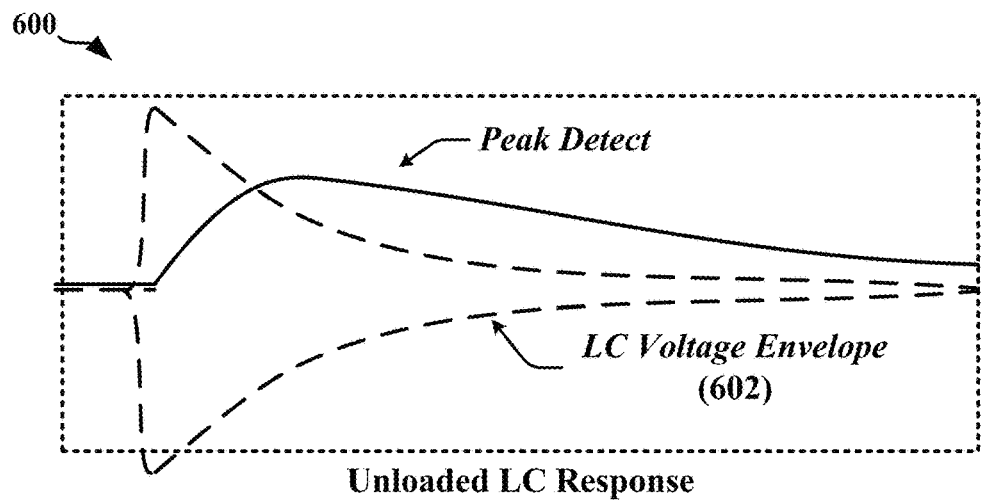
FIG. 6 illustrates examples of observed differences in responses to a passive ping in accordance with certain aspects disclosed herein.
Figure 6:
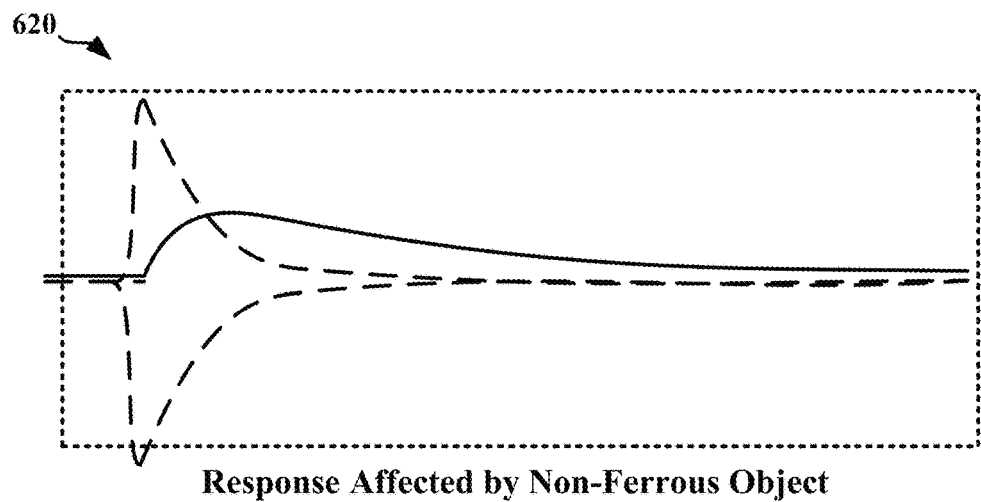
Figure 6:
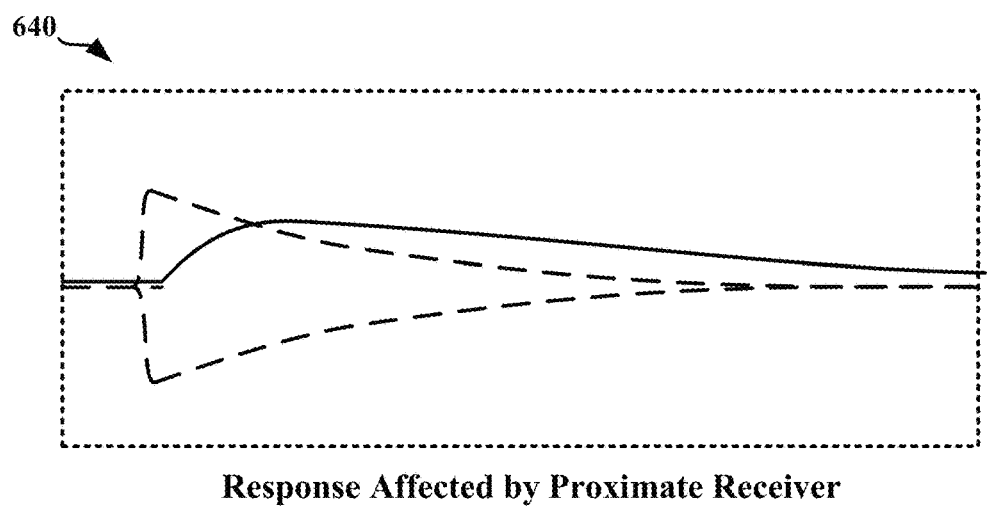

FIG. 6 illustrates a set of examples in which differences in responses 600, 620, 640 may be observed. A passive ping is initiated when a driver circuit 304 excites the resonant circuit 306 using a pulse that is shorter than 2.5 µs. Different types of wireless receivers and foreign objects placed on the transmitter result in different responses observable in the voltage at the LC node 310 or current in the resonant circuit 306 of the transmitter. The differences may indicate variations in the Q factor of the resonant circuit 306 frequency of the oscillation of $V_0$. Table 2 illustrates certain examples of objects placed on the charging pad in relation to an open state.

TABLE 2

| Object | Frequency | $V_{peak}$ (mV) | 50% Decay Cycles | Q Factor |
| --- | --- | --- | --- | --- |
| None present | 96.98 kHz | 134 mV | 4.5 | 20.385 |
| Type-1 Receiver | 64.39 kHz | 82 mV | 3.5 | 15.855 |
| Type-2 Receiver | 78.14 kHz | 78 mV | 3.5 | 15.855 |
| Type-3 Receiver | 76.38 kHz | 122 mV | 3.2 | 14.496 |
| Misaligned Type-3 Receiver | 210.40 kHz | 110 mV | 2.0 | 9.060 |
| Ferrous object | 93.80 kHz | 110 mV | 2.0 | 9.060 |
| Non-ferrous object | 100.30 kHz | 102 mV | 1.5 | 6.795 |

In Table 2, the Q factor may be calculated as follows:

$$Q = \frac{\pi N}{\ln(2)} \cong 4.53N, \qquad (2)$$

where N is the number of cycles from excitation until amplitude falls below 0.5 $V_0$.

Figure 7:
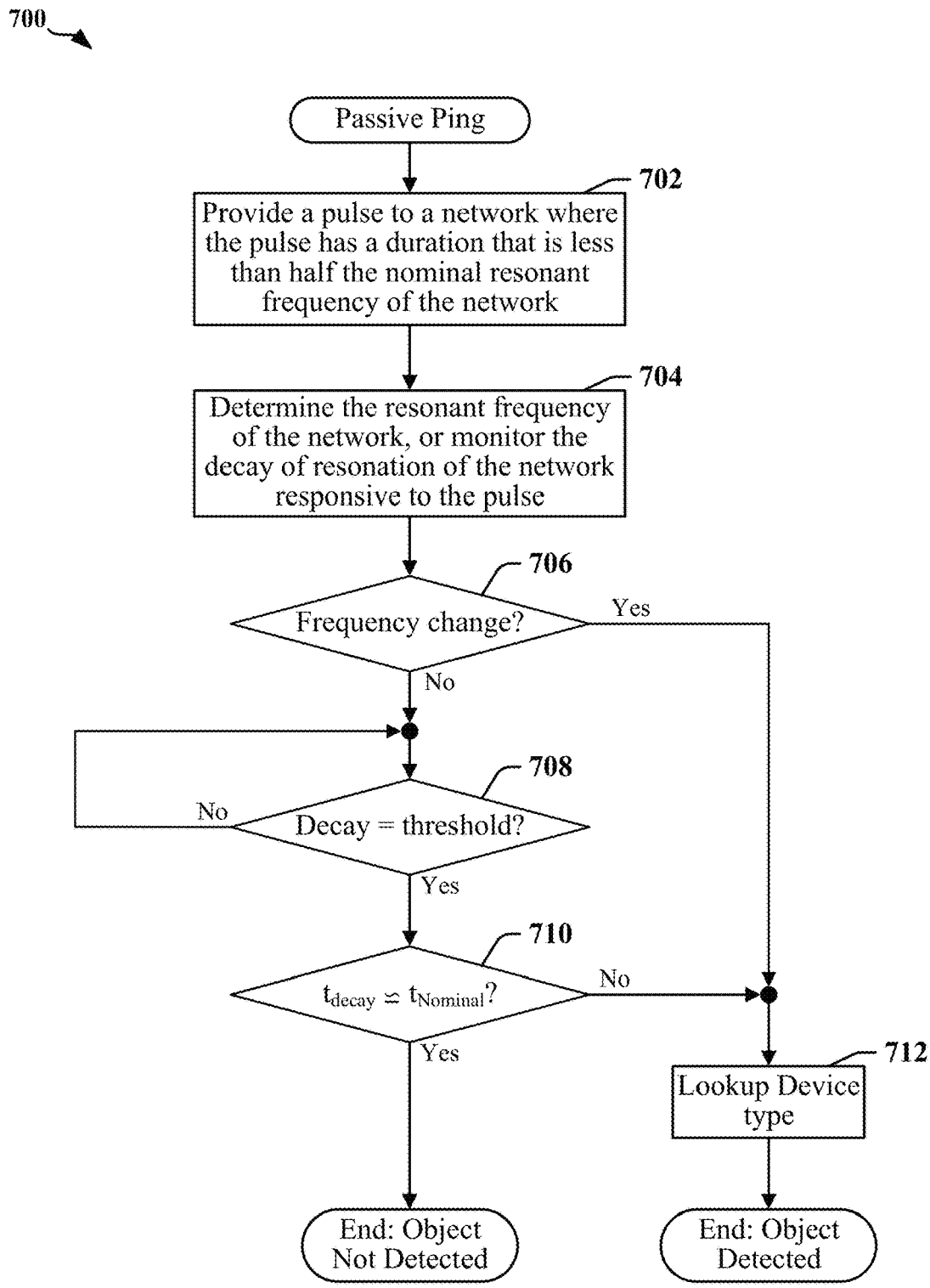
FIG. 7 is a flowchart that illustrates a method involving passive ping implemented in a wireless charging device adapted in accordance with certain aspects disclosed herein.

FIG. 7 is a flowchart 700 that illustrates a method involving passive ping implemented in a wireless charging device adapted in accordance with certain aspects disclosed herein. At block 702, a controller may generate a short excitation pulse and may provide the short excitation pulse to a network that includes a resonant circuit. The network may have a nominal resonant frequency and the short excitation pulse may have a duration that is less than half the nominal resonant frequency of the network. The nominal resonant frequency may be observed when the transmitting coil of the resonant circuit is isolated from external objects, including ferrous objects, non-ferrous objects and/or receiving coils in a device to be charged.

At block 704, the controller may determine the resonant frequency of the network or may monitor the decay of resonation of the network responsive to the pulse. According to certain aspects disclosed herein, the resonant frequency and/or the Q factor associated with the network may be altered when a device or other object is placed in proximity to the transmitting coil. The resonant frequency may be increased or decreased from the nominal resonant frequency observed when the transmitting coil of the resonant circuit is isolated from external objects. The Q factor of the network may be increased or decreased with respect to a nominal Q factor measurable when the transmitting coil of the resonant circuit is isolated from external objects. According to certain aspects disclosed herein, the duration of delay can be indicative of the presence or type of an object placed in proximity to the transmitting coil when differences in Q factor prolong or accelerate decay of amplitude of oscillation in the resonant circuit with respect to delays associated with a nominal Q factor.

In one example, the controller may determine the resonant frequency of the network using a transition detector circuit configured to detect zero crossings of a signal representative of the voltage at the LC node 310 using a comparator or the like. In some instances, direct current (DC) components may be filtered from the signal to provide a zero crossing. In some instances, the comparator may account for a DC component using an offset to detect crossings of a common voltage level. A counter may be employed to count the detected zero crossings. In another example the controller may determine the resonant frequency of the network using a transition detector circuit configured to detect crossings through a threshold voltage by a signal representative of the voltage at the LC node 310, where the amplitude of the signal is clamped or limited within a range of voltages that can be detected and monitored by logic circuits. In this example, a counter may be employed to count transitions in the signal. The resonant frequency of the network may be measured, estimated and/or calculated using other methodologies.

In another example, a timer or counter may be employed to determine the time elapsed for $V_{LC}$ to decay from voltage level $V_0$ to a threshold voltage level. The elapsed time may be used to represent a decay characteristic of the network. The threshold voltage level may be selected to provide sufficient granularity to enable a counter or timer to distinguish between various responses 600, 620, 640 to the pulse. $V_{LC}$ may be represented by detected or measured peak, peak-to-peak, envelope 602 and/or rectified voltage level. The decay characteristic of the network may be measured, estimated and/or calculated using other methodologies.

If at block 706, the controller determines that a change in resonant frequency with respect to a nominal resonant frequency indicate presence of an object in proximity to the transmitting coil, the controller may attempt to identify the object at block 712. If the controller determines at block 706 that resonant frequency is substantially the same as the nominal resonant frequency, the controller may consider the decay characteristic of the amplitude of oscillation in the resonant circuit at block 708. The controller may determine that the resonant frequency of the network is substantially the same as the nominal resonant frequency when the frequency remains within a defined frequency range centered on, or including the nominal resonant frequency. In some implementations, the controller may identify objects using changes in resonant frequency and decay characteristics. In these latter implementations, the controller may continue at block 708 regardless of resonant frequency, and may use changes in change in resonant frequency as an additional parameter when identifying an object positioned proximately the transmission coil.

At block 708, the controller may use a timer and/or may count the cycles of the oscillation in the resonant circuit that have elapsed between the initial $V_0$ amplitude and a threshold amplitude used to assess the decay characteristic. In one example, $V_0/2$ may be selected as the threshold amplitude. At block 710, the number of cycles or the elapsed time between the initial $V_0$ amplitude and the threshold amplitude may be used to characterize decay in the amplitude of oscillation in the resonant circuit, and to compare the characterize decay with a corresponding nominal decay characteristic. If at block 710, no change in frequency and delay characteristic is detected, the controller may terminate the procedure with a determination that no object is proximately located to the transmission coil. If at block 710, a change in frequency and/or delay characteristic has been detected, the controller may identify the object at block 712.

At block 712, the controller may be configured to identify receiving devices placed on a charging pad. The controller may be configured to ignore other types of objects, or receiving devices that are not optimally placed on the charging pad including, for example, receiving devices that are misaligned with the transmission coil that provides the passive ping. In some implementations, the controller may use a lookup table indexed by resonant frequency, decay time, change in resonant frequency, change in decay time and/or Q factor estimates. The lookup table may provide information identifying specific device types, and/or charging parameters to be used when charging the identified device or type of device.

Passive ping uses a very short excitation pulse that can be less than a half-cycle of the nominal resonant frequency observed at the LC node 310 in the resonant circuit 306. A conventional ping may actively drive a transmission coil for more than 16,000 cycles. The power and time consumed by a conventional ping can exceed the power and time use of a passive ping by several orders of magnitude. In one example, a passive ping consumes approximately 0.25 µJ per ping with a max ping time of around ~100 µs, while a conventional active ping consumes approximately 80 mJ per ping with a max ping time of around 90 ms. In this example, energy dissipation may be reduced by a factor of 320,000 and the time per ping may be reduced by a factor of 300.

Detection and characterization of the decay of the voltage at the LC node 310 may require fast, sensitive and/or low-voltage circuits to accommodate the low-power nature of resonant signals at the LC node 310 when a short excitation pulse is used to produce resonant signals in the resonant circuit 306. In some instances, passive ping may be implemented using a burst of energy at the nominal resonant frequency of the resonant circuit 306. The burst of energy may have a duration of several periods of the nominal resonant frequency. This burst-mode passive ping necessarily consumes more energy per ping that passive ping that is initiated by short excitation pulses. The additional energy provides additional time to characterize resonant response.

Figure 8:
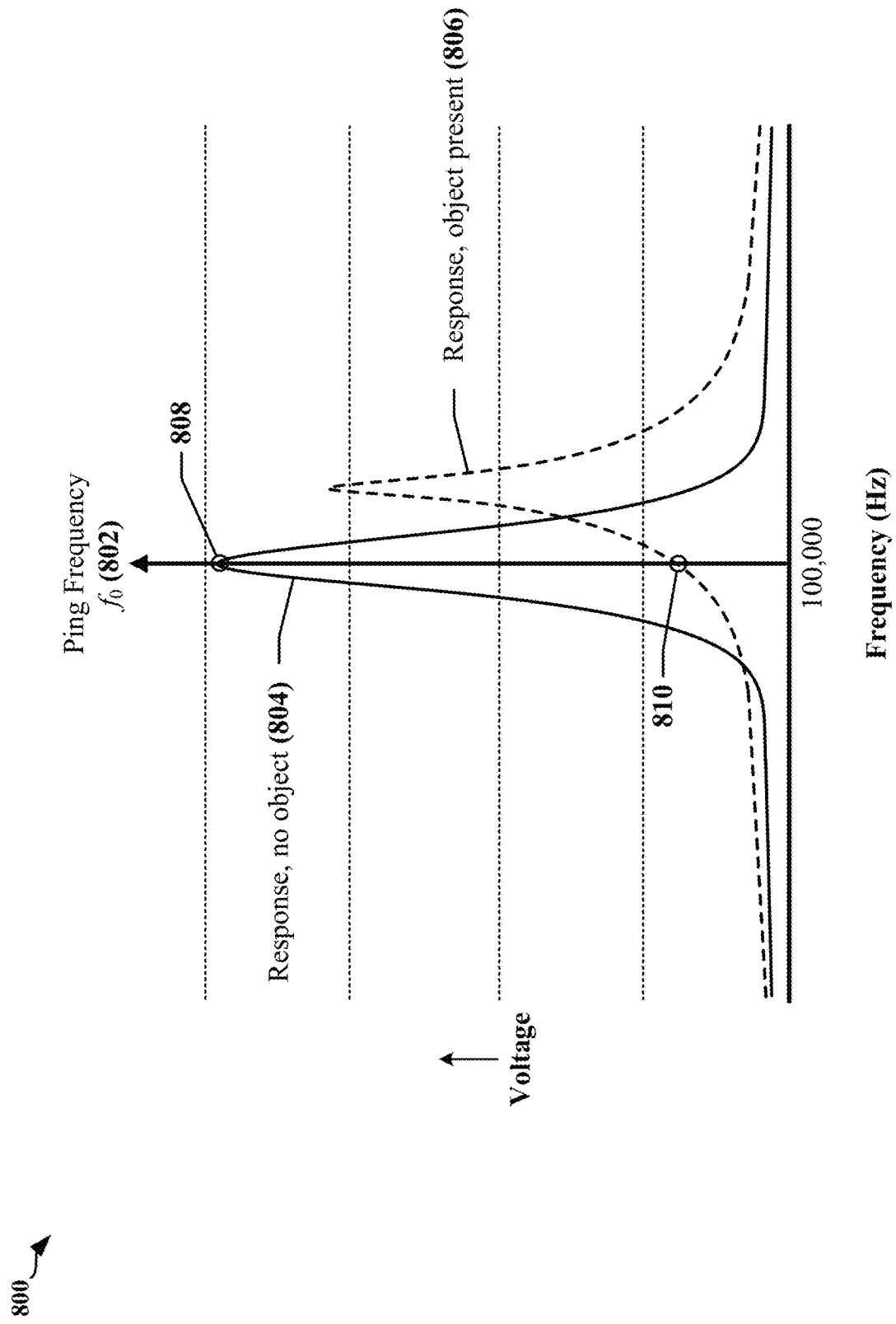
FIG. 8 illustrates frequency response of a resonant circuit to a ping provided at the resonant frequency of the resonant circuit.

FIG. 8 illustrates a first example of the frequency responses 800 of the resonant circuit 306 when the resonant circuit 306 is stimulated by a ping that includes several cycles of a signal that oscillates at or near the nominal resonant frequency ($f_0$ 802) of the resonant circuit 306. A first frequency response 804 illustrates the response of the resonant circuit 306 when no device is present, while a second frequency response 806 illustrates the response of the resonant circuit 306 when a chargeable object is present. The chargeable object reduces the Q-factor of the resonant circuit 306. The higher Q-factor of the resonant circuit 306 when no device is present causes the resonant circuit 306 to produce a significantly higher voltage response 808 and draw the maximum current with the longest decay time in response to a passive ping at $f_0$ 802 than the voltage response 810 produced when a chargeable device lowers the Q-factor of the resonant circuit 306, causing the resonant circuit 306 to produce lower voltage, draw less current and have a shorter decay time in response to a passive ping at $f_0$ 802. In typical applications, no object is present for a majority of the time a charging device is in operation, and the resonant circuit 306 in the charging device has a high Q-factor for a majority of the time. The high Q-factor results in a high power draw. The resonant circuit 306 has a slower response time when it has a high Q-factor, since more time is needed for the ping energy to decay thereby delaying initiation of another ping.

Figure 9:
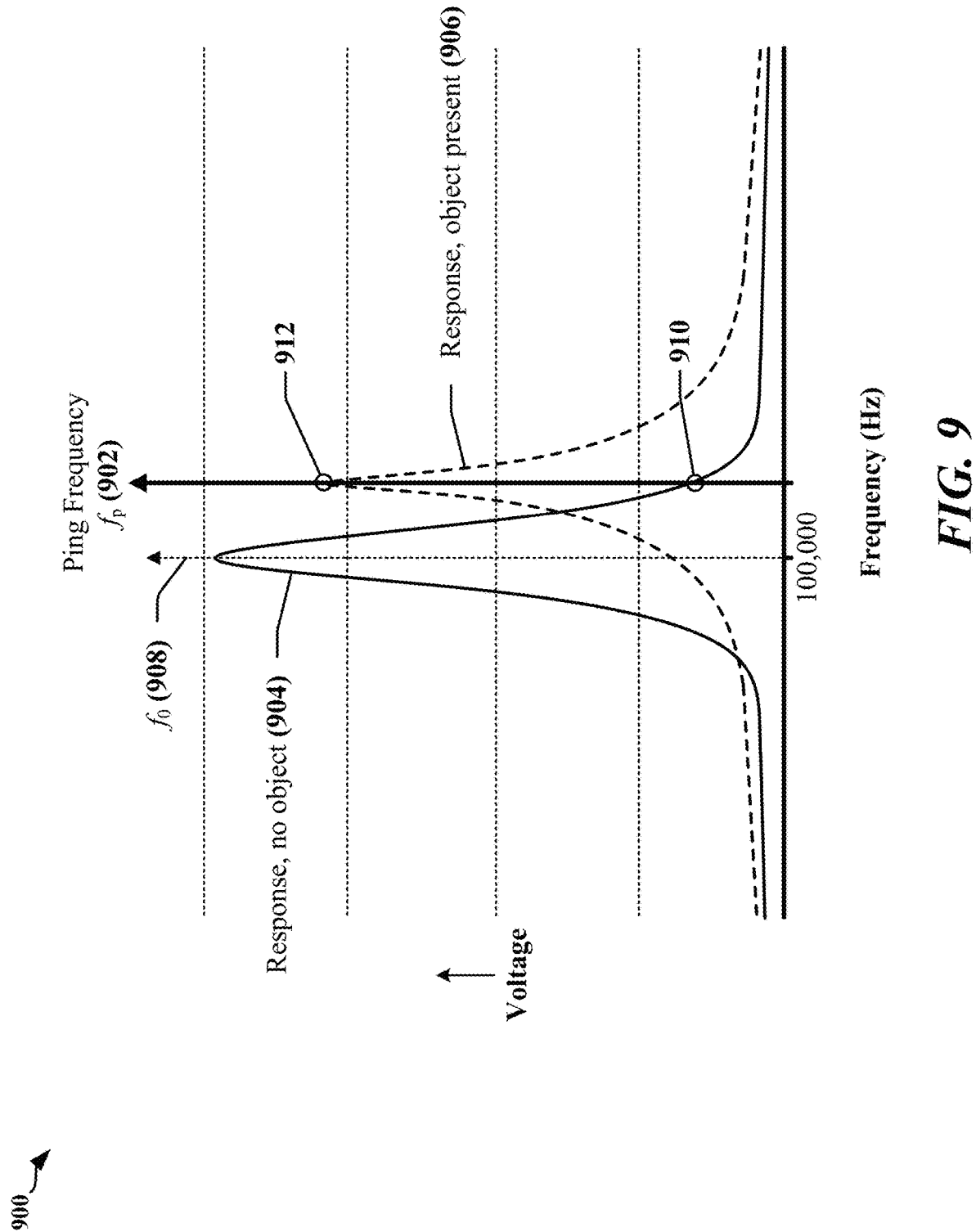
FIG. 9 illustrates frequency response of a resonant circuit illustrating the effect of a ping provided at a frequency greater than the resonant frequency of the resonant circuit in accordance with certain aspects disclosed herein.

FIG. 9 illustrates a second example of frequency responses 900 of the resonant circuit 306 illustrating the effect of a ping provided as a multi-period burst at a frequency ($f_p$ 902) that is greater than the nominal resonant frequency ($f_0$ 908) of the resonant circuit 306. In some implementations, the ping is provided as a multi-period burst at a frequency that is lower than $f_0$ 908. In this example, the dominant state of the charging device, where no chargeable object is present, results in a lower power draw and faster decay rate resulting in faster performance with respect to the example illustrated in FIG. 8. The ping process results in limited higher-power draw and increased decay rate that occurs for the ping that leads to detection of a chargeable object. Additional passive pings are typically superfluous after detection.

The resonant circuit 306 may be stimulated during passive ping by a signal that has a duration that can include several cycles at $f_p$ 902. A first frequency response 904 illustrates the response of the resonant circuit 306 when no device is present, while a second frequency response 906 illustrates the response of the resonant circuit 306 when a chargeable object is present. The chargeable object reduces the Q-factor of the resonant circuit 306. The resonant circuit 306 produces a significantly lower voltage response 910 and draws a lower current with a shorter decay time in response to a passive ping at $f_p$ 902 when no device is present than the voltage response 912 produced when a chargeable device is present. In typical applications, no object is present for a majority of the time a charging device is in operation, and the resonant circuit 306 exhibits a lower power consumption and a faster decay time per ping with respect to the example illustrated in FIG. 8.

The frequency spread ($f_p$-$f_0$ or $f_0$-$f_p$) between the resonant frequency ($f_0$ 908) and the ping frequency ($f_p$ 902) may be proportionate to the value of $f_0$ 908. For example, the frequency spread may increase as $f_0$ 908 increases. In some implementations, the frequency spread and $f_0$ 908a have a logarithmic (log base 10) relationship. In an example that is compliant or compatible with Qi standards, where 80 Khz<$f_0$<110 Khz, a passive ping frequency may be defined such that 175 KHz<$f_p$<210 KHz.

According to certain aspects disclosed herein, frequency spread may be selected as a trade-off between signal-to-noise ratio (SNR) and power consumption or response time. In the example illustrated in FIG. 9, an overly-high value for frequency spread may result in lower SNR, while an overly-high value for frequency spread may result in high power draw and/or slow response. The optimal balance between SNR and power draw may vary by application. In some implementations, the lowest power and fast scan rate is obtained by setting $f_p$ 902 as high as possible while permitting reliable detection of objects given SNR for the system.

The duration of a passive ping pulse can be defined as a number of fraction of cycles of $f_p$ 902. In one example, the duration of the passive ping pulse may be set to a half-cycle of $f_p$ 902. In another example, the duration of the passive ping pulse may be set to multiple cycles of $f_p$ 902. In some implementations, the duration of the passive ping pulse includes enough half-cycles of $f_p$ 902 to obtain a current draw in the detectable range of an analog-to-digital converter (ADC) in microprocessor of a charging device. The passive ping pulse may include additional cycles to accommodate the SNR margin. The number of additional cycles may be the subject of a trade-off to increase the SNR, while limiting power and ping time. In one example, where $f_p$=190 KHz and $f_0$=100 KHz, the duration of the passive ping pulse is less than 1000.

The repetition rate for passive ping pulses can be determined dynamically when speed of detection is prioritized. In one example, the ADC can be checked to determine when current has fallen back to zero before starting the next passive ping pulse. In this manner, a detection circuit can determine that no energy remains in the resonant circuit 306 from the previous ping pulse before initiating the next passive ping pulse. In some implementations, a fixed delay between pulses may be implemented. In one example, the fixed delay may be configured to be 6 tomes the longest decay time constant expected or observed in the resonant circuit 306. In one example, the fixed delay may be configured to provide a one millisecond interval between pulses. The one millisecond ping interval may enable an 18 coil charging pad to be scanned in 18 mS, permitting sub-second device detection. The fixed time approach can be used if further optimization for speed is not necessary. When larger numbers of charging coils are provided in a charging pad, a dynamic ping interval may be used.

According to certain aspects disclosed herein, coils in one or more charging cells may be selectively activated to provide an optimal electromagnetic field for charging a compatible device. In some instances, coils may be assigned to charging cells, and some charging cells may overlap other charging cells. In the latter instances, the optimal charging configuration may be selected at the charging cell level. In other instances, charging cells may be defined based on placement of a device to be charged on a charging surface. In these other instances, the combination of coils activated for each charging event can vary. In some implementations, a charging device may include a driver circuit that can select one or more cells and/or one or more predefined charging cells for activation during a charging event.

Dynamic Inferred Coupling Estimation

Certain aspects of this disclosure relate to detection of an optimal or optimized charging configuration in a wireless charging system, including charging systems adapted for concurrent charging of multiple devices or batteries. Optimization of a charging configuration may be conducted when a device or battery to be charged can be placed on or near different transmitter coils on a surface provided by the charging device. The charging configuration may be determined by detecting one or more charging coils that exhibit best coupling to the receiving device or battery.

Figure 10:
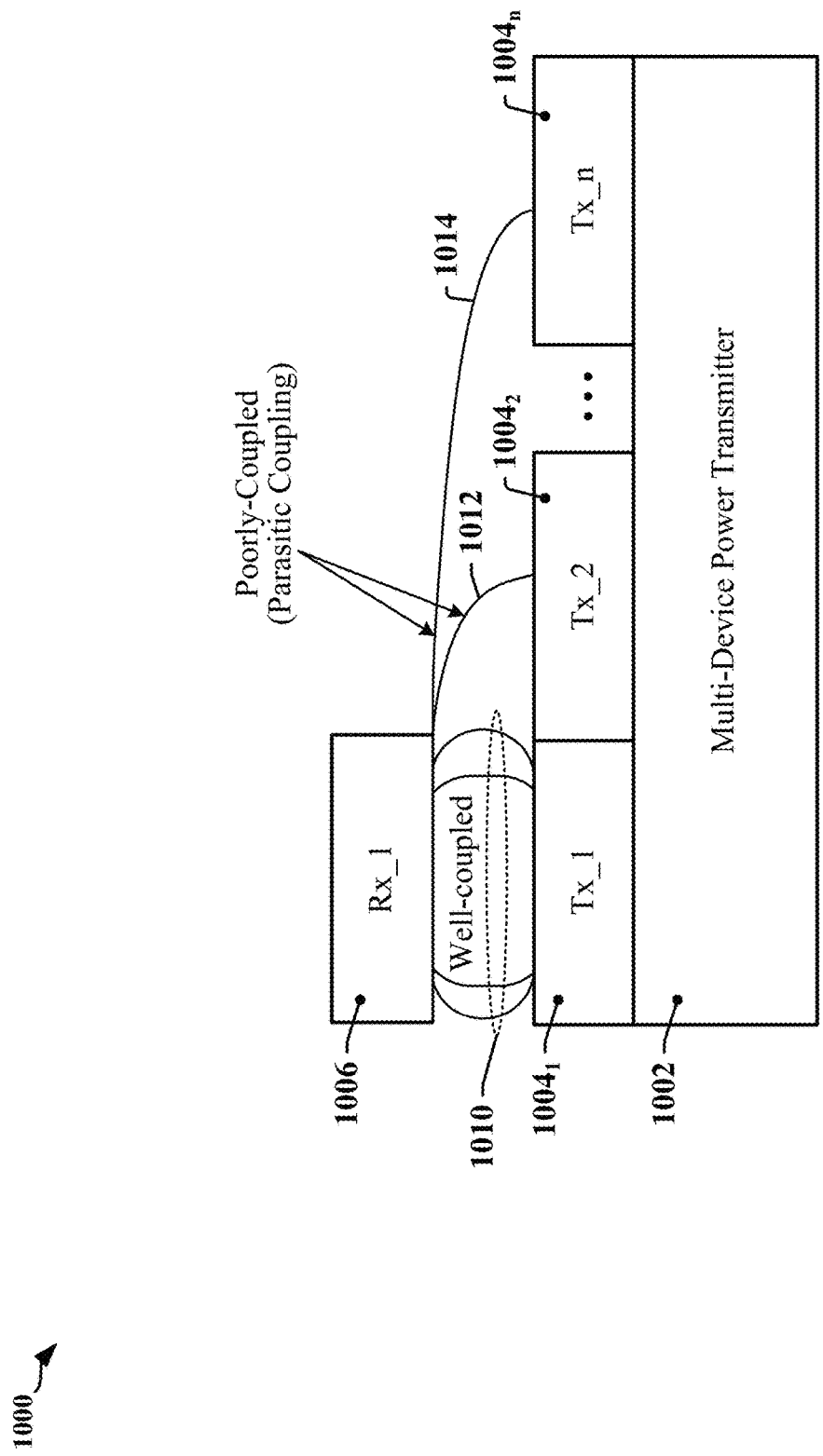
FIG. 10 illustrates an example of coupling in a wireless charging system that includes multiple charging coils in accordance with certain aspects disclosed herein.

FIG. 10 illustrates an example 1000 of coupling in a wireless charging system 1002 that includes multiple charging coils $1004_1$-$1004_n$. The wireless charging system 1002 may be configured to charge a device or battery (receiving device 1006) based on placement near one of a number of different sections of the charging area provided by the charging coils $1004_1$-$1004_n$. In the illustrated example 1000, the receiving device 1006 is closely aligned with a first charging coil $1004_1$ and proximate to one or more other charging coils $1004_2$-$1004_n$. The receiving device 1006 is well-coupled to the first charging coil $1004_1$, with a relatively strong flux 1010 coupling the receiving device 1006 to the first charging coil $1004_1$ when the first charging coil $1004_1$ is activated. The receiving device 1006 may be poorly-coupled to other charging coils $1004_2$-$1004_n$, and few lines of flux 1012, 1014 couple the receiving device 1006 to the other charging coils $1004_2$-$1004_n$ when the first charging coil $1004_1$ is activated. The coupling between the receiving device 1006 and the other charging coils $1004_2$-$1004_n$ may be referred to as parasitic coupling.

The higher quality coupling between the receiving device 1006 and the first charging coil $1004_1$ can result in superior power transfer efficiency. The higher quality coupling reduces the reactive power required by the primary LC of the first charging coil $1004_1$. Lowered reactive power results in lower losses due to lower power dissipation in parasitic resistances in the first charging coil $1004_1$.

The higher quality coupling between the receiving device 1006 and the first charging coil $1004_1$ can produce uncontained magnetic flux (see the lines of flux 1012, 1014 coupling the receiving device 1006 to the other charging coils $1004_2$-$1004_n$). Uncontained magnetic flux may couple the first charging coil $1004_1$ with other devices and/or objects, resulting in interference as well as losses resulting from eddy currents induced in metal objects. Uncontained flux can also result in a larger electromagnetic interference (EMI) signature, and can increase radio interference. Increased radio interference may prevent the wireless charging system 1002 to from complying with regulatory standards for EMI promulgated by government entities such as standards defined by the United States Federal Communications Commission (FCC) and the standards associated with the CE mark of the European Economic Area.

Figure 11:
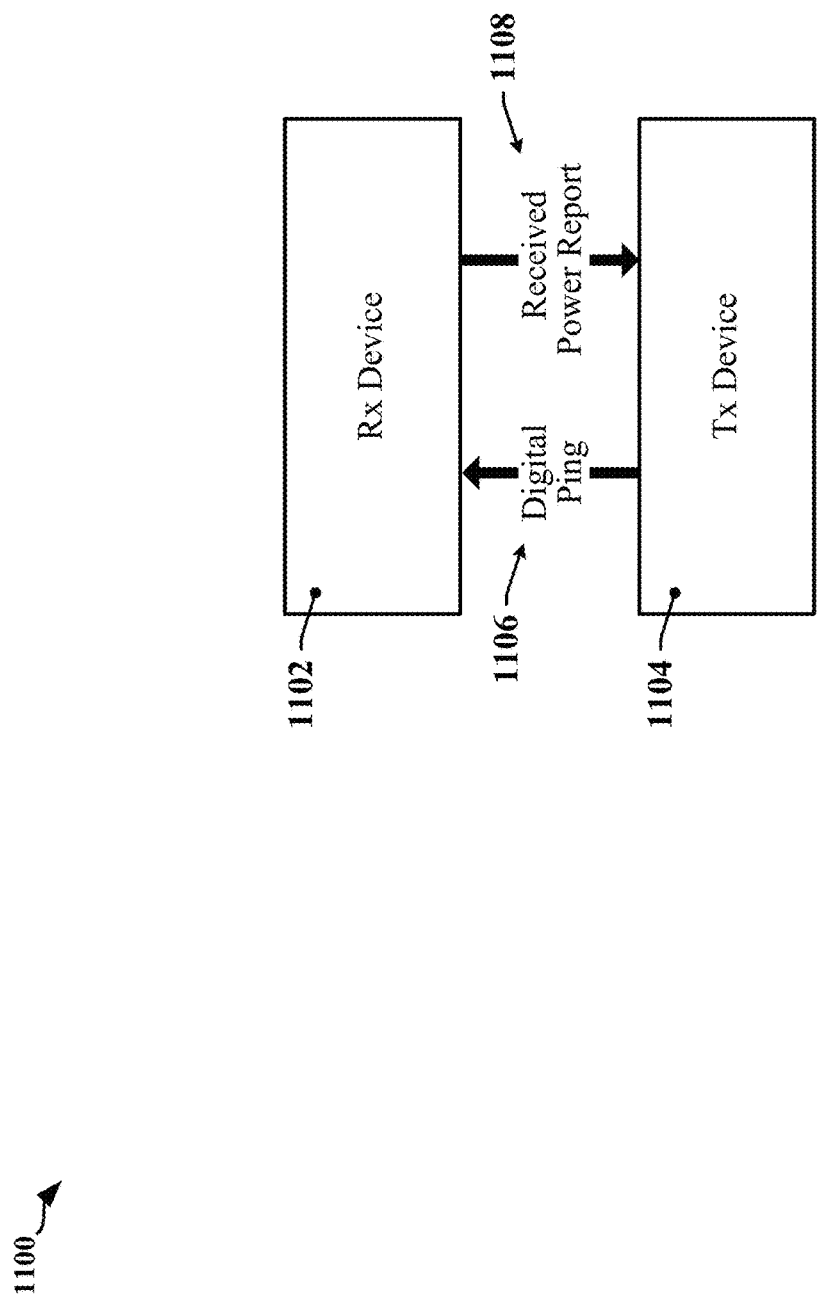
FIG. 11 illustrates a charging environment in which a receiving device and a charging device exchange messages including digital pings and received power reports.

When multiple Tx coils and receiving coils are near, or are parts of the same system, crosstalk can result. For example, crosstalk can result when multiple charging coils $1004_1$-$1004_n$ are located within a wireless charging system 1002 used to charge the receiving device 1006. Crosstalk can cause digital messages exchanged between transmitter and receiver where digital messages between a pair of devices may be receivable by a third device. FIG. 11 illustrates a charging environment 1100 in which a receiving device 1102 and a charging device 1104 exchange messages including digital pings 1106 and received power reports 1108. Crosstalk can disrupt messaging between the receiving device 1102 and the charging device 1104, resulting in unreliable operation of a wireless charging system 1002.

Certain aspects of the disclosure enable a coupling configuration to be determined in real-time, enabling a power transmitter to distinguish between power signals from well-coupled devices and from more distant, more poorly-coupled devices. The availability of coupling configuration information enables a pair of well-coupled devices to filter or ignore transmissions from poorly-coupled devices or charging coils, thereby preventing or reducing erroneous charging operations.

As disclosed herein, certain methods for detecting coupling in wireless charging systems include the two-step process illustrated in FIG. 11. The charging device 1104 transmits a digital ping 1106 when it detects a potentially chargeable device. The receiving device 1102 responds by transmitting a protocol-defined response to the digital ping 1106. In the illustrated example, the response includes a power report 1108 that may inform the charging device 1104 of the received power level as determined by the receiving device 1102. Certain aspects disclosed herein address the disadvantages observed in conventional systems that include slow detection and negotiation and the quantity of energy required to be sent in the digital ping 1106 to enable measurement of received power. When multiple charging coils $1004_1$-$1004_n$ and are operated concurrently in a wireless charging system 1002, then two or more charging coils $1004_1$-$1004_n$ may send a digital ping 1106 when searching or confirming presence of potentially chargeable devices, resulting in increased time and power consumption. Parasitic messages from nearby, poorly-coupled devices may inhibit or prohibit a power transmitter from querying potentially chargeable devices. In some instances, the charging device may mistakenly respond to the parasitic messages.

Certain aspects of this disclosure provide for Dynamic Inferred Coupling Estimation (DICE) in order to detect quality of coupling in real-time. In one example, DICE includes an evaluation of the ratio of real power to reactive power in a circuit that includes a transmitting coil and series resonant capacitor. The amount of reactive power stored in the inductor-capacitor (LC) circuit of the transmitter is substantially influenced by the coupling coefficient. The coupling coefficient defines the ratio of mutual inductance to leakage inductance in the LC circuit of the wireless transmitter. For example, leakage inductance in the LC circuit of the wireless transmitter may be expressed as:

$$Tx_{leakage} = L_{Tx} \times (1-k), \quad (5)$$

where $L_{Tx}$ represents the self-inductance of the transmitter coil, and k represents the coupling coefficient. Decreasing coupling reduces coupling coefficient and increases leakage inductance, resulting in more reactive energy being stored in the leakage inductance of the transmitter. Energy stored in the leakage inductance does not contribute to power transfer and, as energy builds up in the leakage inductance, the voltage at the LC node increases.

Certain aspects of the coupling between one or more charging coils $1004_1$-$1004_n$ and a receiving device 1006 may be characterized by voltage measured at the LC node. Voltage measurements taken at the LC node may be available for other reasons. In some instances, voltage at the LC node may be monitored as an overvoltage indicator used to protect power electronics and the resonant capacitor. In one example, the measurement circuit includes a voltage comparator configured to detect voltages exceeding a threshold level. According to certain aspects disclosed herein, a measurement circuit may be added, or an existing measurement circuit may be used to quantify or compare a voltage at the LC node that varies directly with the quality of coupling.

Referring again to Eq. 5, when k is close in value to 1, the voltage of the LC node may be near that of the driving source voltage, as there would be substantially no stored energy attributable to the leakage inductance, and no voltage increase due to stored energy in the leakage inductance. As coupling decreases, leakage inductance increases, and energy is stored in the LC circuit of the transmitter. This stored energy may be accompanied by an increase in voltage and/or current in the LC circuit of the transmitter. The resultant additional reactive energy may have the secondary effect of dissipating additional power in the parasitic resistance associated with the LC circuit of the transmitter. These extra losses can cause a high input power draw for the same output power delivered to the load in the receiver, and a resultant reduction in overall system efficiency.

The tables 1200, 1220, 1240 in FIG. 12 illustrate the effect of coupling on voltage measured at the LC circuit of the transmitter in a wireless charging system 1002. Each table 1200, 1220, 1240 lists measurements that correspond to a power transfer from a transmitter to a receiver that is connected to fixed load, where the coupling of the system is adjusted by incrementing the separation between the transmitter and receiver using spacers, which may be formed as plastic shims. In the first table 1200, the receiver is connected to a 100 mA load, in the second table 1220, the receiver is connected to no load (0 mA), and in the third table 1240, the receiver is connected to a 250 mA load. The tables 1200, 1220, 1240 illustrate that input current (Lin) varies with load and spacing, while the peak voltage (Vpk) measured at the LC node varies substantially with changes in coupling and is substantially independent of changes in load.

Figure 13:
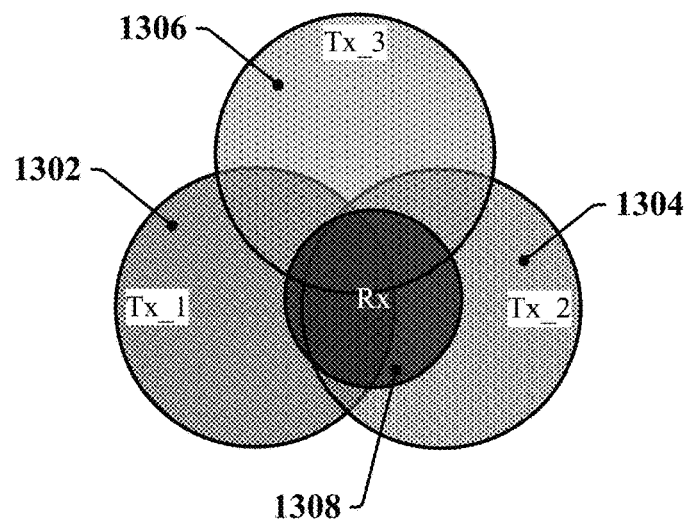
FIG. 13 illustrates effects of placement and movement of chargeable devices in accordance with certain aspects disclosed herein.
Figure 13:
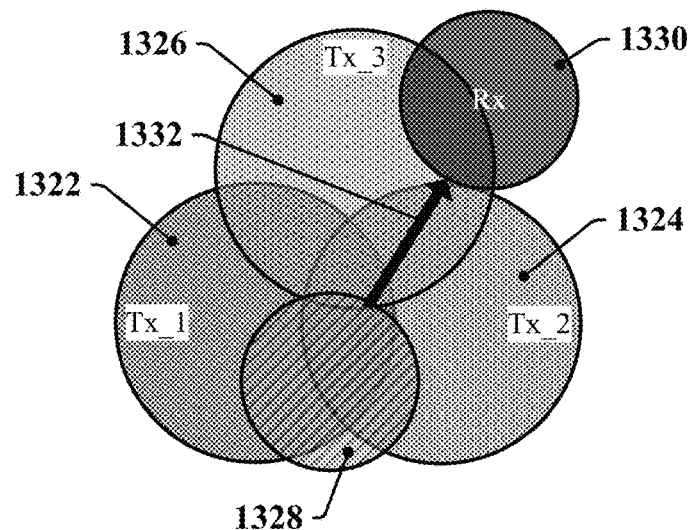

According to certain aspects of the disclosure, Vpk measured at the LC node may be used as a stable metric for detecting changes in coupling coefficient. With reference to FIG. 13, the metric may be used to determine the optimal charging configuration when a chargeable device 1308 has been placed on a charging surface 1300, 1320 of a multi-driver, free-position charger, and/or to detect real-time changes 1332 in receiver position.

In one aspect, the use of a metric to characterize coupling coefficient in real-time allows the charging system to determine the optimal charging configuration. The optimal charging configuration may identify the best charging coil 1302, 1304, 1306 to be used for power transfer to a chargeable device 1308. The optimal charging configuration may provide an optimal power level that permits the chargeable device 1308 to be charged at an optimal rate while minimizing losses due to parasitic effects. The best coil 1304 for charging may be selected from multiple charging coils 1302, 1304, 1306 based on a comparison of metrics derived from Vpk measurements.

In some implementations, a modified active ping process may be implemented to select an optimal charging configuration. Conventionally, a transmitter in a wireless power transmitting system fully powers each charging coil 1302, 1304, 1306 in turn. The transmitter waits for digital communications to be established in order to check the connection quality. The transmitter repeats the process for each of charging coil 1302, 1304, 1306.

A wireless power transmitting system adapted in accordance with certain aspects disclosed herein may employ DICE to select an optimal charging configuration. A small packet of energy may be sent to each candidate charging coil 1302, 1304, 1306. In some implementations, the small packet of energy may be sent to all candidate charging coils 1302, 1304, 1306 at the same time. In one example, the charging coil 1304 with the lowest Vpk may be selected for power transfer, where the lowest Vpk is indicative of highest coupling.

In one aspect, the use of a metric to characterize coupling in real-time can allow the charging system to detect real-time changes in receiver position. A free-position charging system is typically required to respond to movement of a chargeable device 1330 from an original position 1328 across a charging surface during charging. Conventional wireless charging systems generally cannot gracefully react to sudden changes in position of a chargeable device 1330. In these conventional systems, the charging must be stopped the charging system must renegotiate with the chargeable device 1330 through a new charging coil 1326 after the charging device has detected the relocated chargeable device 1330.

A wireless power transmitting system adapted in accordance with certain aspects disclosed herein may employ DICE to detect movement of a receiving chargeable device 1330, including when the chargeable device 1330 is moving or has moved before without fully disconnected from its current charging coil charging coils 1322 or 1324. In one example, the charging device can determine that Vpk has exceeded a pre-set threshold value, and may activate one or more adjacent charging coils 1302, 1304, 1306 to commence immediate evaluation of coupling. As soon as coupling in an adjacent charging coil 1302, 1304, 1306 becomes better than coupling in the active charging coil 1302 or 1304, power transfer can be transitioned to the new charging coil 1306. The chargeable device 1330 may remain unaware that power transfer has transitioned between charging coils 1302, 1304, 1306, and the flow of power to the receiving device may be uninterrupted.

A wireless power transmitting system adapted in accordance with certain aspects disclosed herein may employ DICE to detect phantom receivers. A phantom receiver may arise due to a type of erroneous operation that occurs when one of two or more devices being charged is removed from the charging surface. The charging circuits associated with the removed device may see messages transmitted by remaining devices. The charging circuits associated with the removed device may continue charging when the removal of the device is not detected because of messages received from one or more remaining devices. According to certain aspects disclosed herein, the wireless power transmitting system may check LC node voltage in the charging circuits associated with the removed device and may thereby detect an abnormally high Vpk while input current draw is low. The wireless power transmitting system may deduce that the messages are not received from a well-coupled power receiver. In some instances, phantom devices may be detected using DICE and a "sneak-away" algorithm.

Sneak-Away

Figure 14:
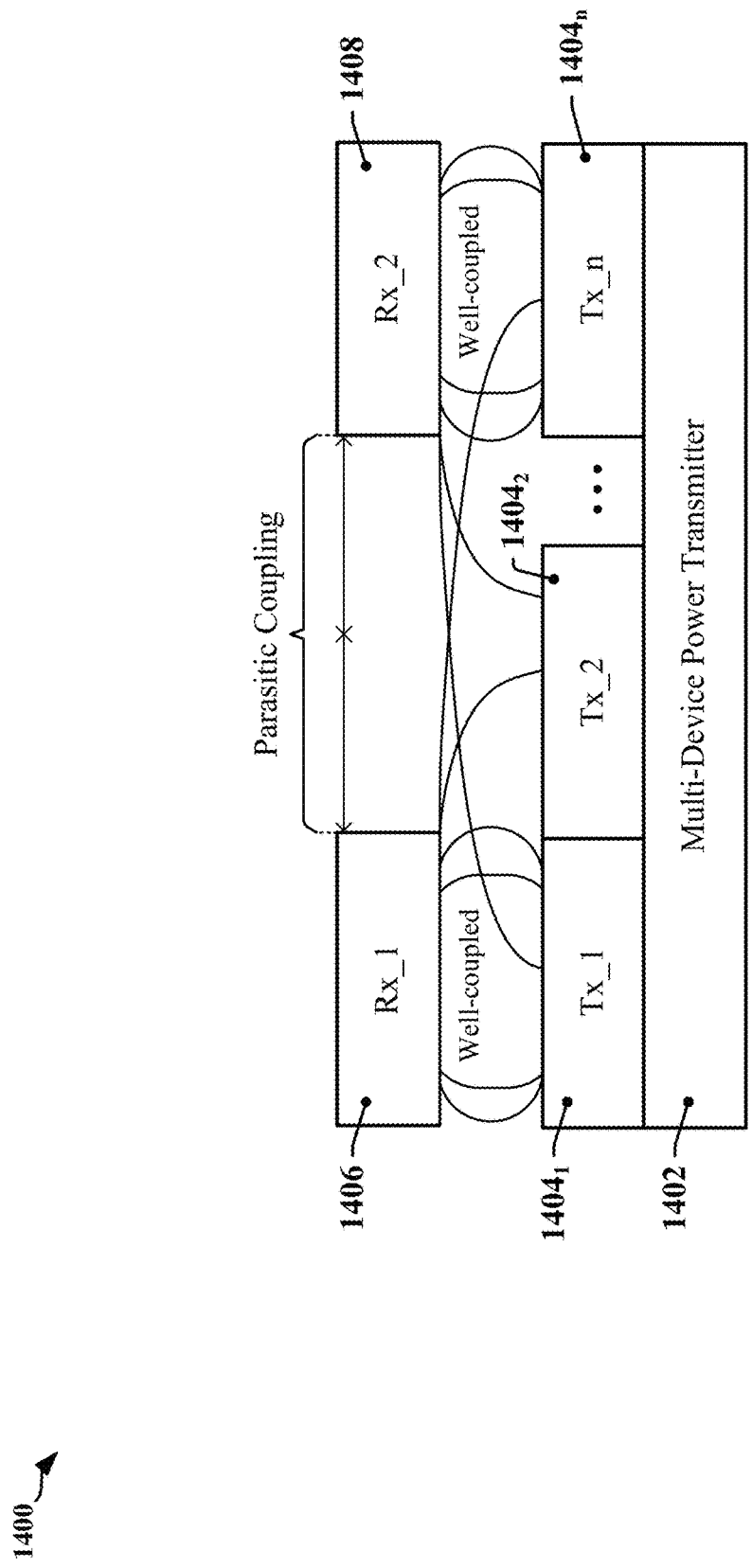
FIG. 14 illustrates an example of removal of a wireless charging system that can concurrently charge multiple devices in accordance with certain aspects disclosed herein.
Figure 15:
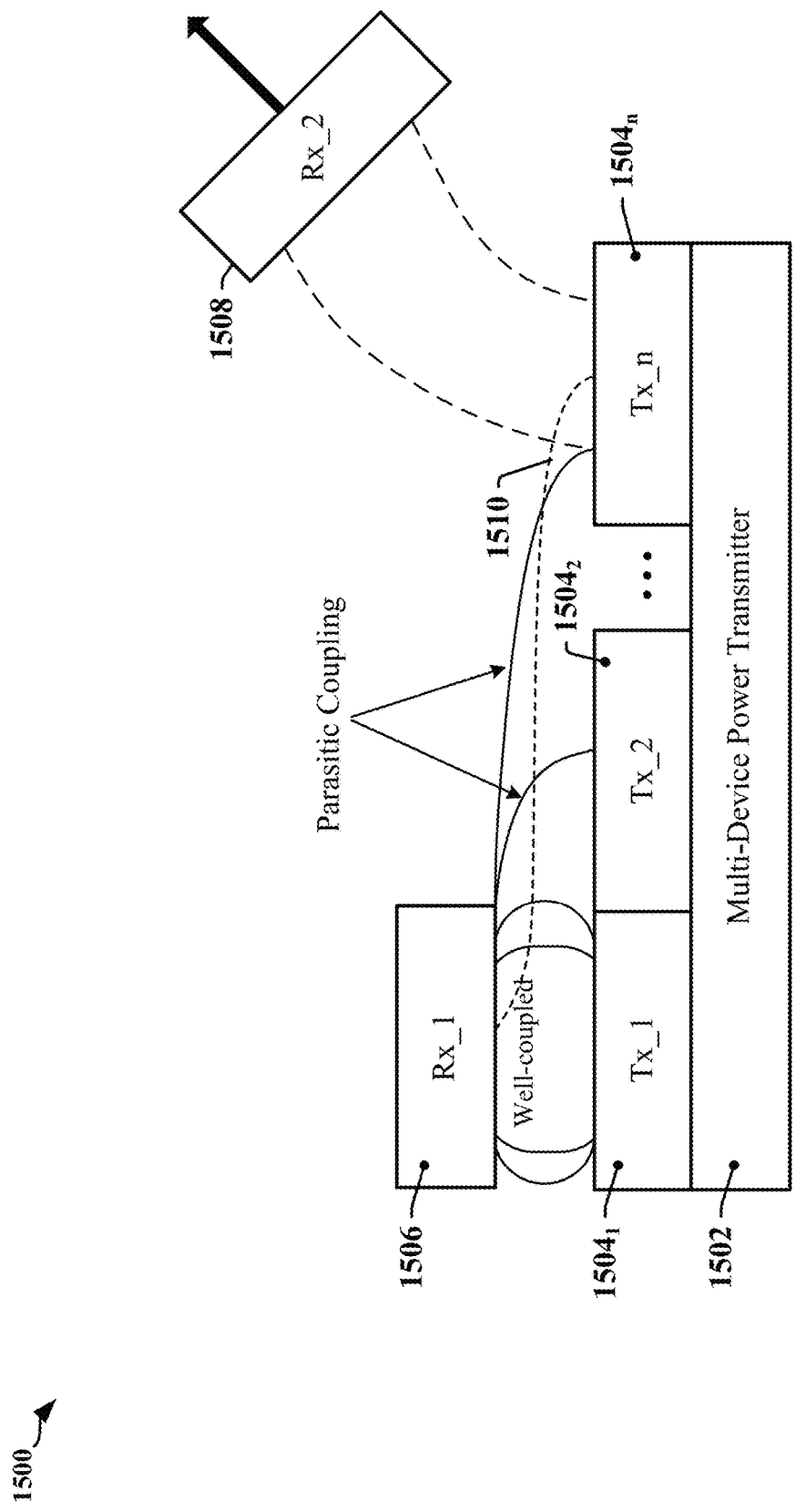
FIG. 15 illustrates an example of removal of a charging device that may result in a wireless power transmitting system detecting a phantom receiver.

FIGS. 14 and 15 illustrate an example of removal of a charging device that may result in a wireless power transmitting system detecting a phantom receiver. In a first configuration 1400, a wireless charging system 1402 includes multiple charging coils $1404_1$-$1404_n$ that can concurrently charge multiple devices or batteries (receiving devices 1406, 1408), which may be placed near different sections of the charging area provided by the charging coils $1404_1$-$1404_n$. In the illustrated example 1400, a first receiving device 1406 is closely aligned with a first charging coil $1404_1$ and proximate to one or more other charging coils $1404_2$-$1404_n$, while a second receiving device 1408 is closely aligned with an $n^{th}$ charging coil $1404_n$ and proximate to one or more other charging coils $1404_1$, $1404_2$. The first receiving device 1406 is well-coupled to the first charging coil $\mathbf{1404_1}$, and the second receiving device 1408 is well-coupled to the $n^{th}$ charging coil $\mathbf{1404_n}$. The receiving devices 1406, 1408 may be poorly-coupled to other charging coils $\mathbf{1404_2\text{-}1404_n}$, and $\mathbf{1404_1\text{-}1404_{n-1}}$, respectively.

In a second configuration 1500, a wireless charging system 1502 includes multiple charging coils $\mathbf{1504_1\text{-}1504_n}$ that can concurrently charge multiple devices or batteries (receiving devices 1506, 1508), which can be placed near different sections of the charging area provided by the charging coils $\mathbf{1504_1\text{-}1504_n}$. In this example 1500, a first receiving device 1506 is closely aligned with a first charging coil $\mathbf{1504_1}$ and proximate to one or more other charging coils $\mathbf{1504_2\text{-}1504_n}$, while a second receiving device 1508 had been closely aligned with an $n^{th}$ charging coil $\mathbf{1504_n}$ but has now been removed from the vicinity of the wireless charging system 1502. The first receiving device 1506 is well-coupled to the first charging coil $\mathbf{1504_1}$, and may be poorly-coupled to other charging coils $\mathbf{1504_2\text{-}1504_n}$.

Typically, when a receiving device 1506, 1508 is well-coupled with a charging coil $\mathbf{1504_1\text{-}1504_n}$, its communication signal is strong enough to overcome any parasitic flux from nearby drivers. In one example, an ASK detector used for communication operates at the high end of its dynamic range. When a receiving device 1508 is removed while another receiving device 1506 is still charging, the parasitic flux from the active receiving device 1506 subverts the flux from the removed receiving device 1508. As the total field intensity on the now uncoupled charging coil $\mathbf{1504_1}$ drops dramatically, the sensitivity of the ASK detector shifts to the lower end of its dynamic range in an attempt to detect weak messages in the absence of a strong magnetic field. At this new high sensitivity, the uncoupled charging coil $\mathbf{1504_1}$ may detect messages 1510 from the parasitic flux coupled from adjacent pads. The communication channel associated with the active receiving device 1506 starts to feed the uncoupled charging coil $\mathbf{1504_1}$ with messages 1510. This results in a phantom receiver detection that keeps the uncoupled charging coil $\mathbf{1504_1}$ operating as if coupled to the removed receiving device 1508.

In one aspect of the disclosure, phantom receiver detection can be averted using an algorithm (the Sneak-Away algorithm) that causes the wireless charging system 1502 to periodically test the power channel to ensure that received messages derive from a well-coupled device rather than from an adjacent device.

In some implementations, the wireless charging system 1502 may reduce its power output through one of the active charging coils $\mathbf{1504_1\text{-}1504_n}$. A receiving device 1506, 1508 coupled to the active charging coils $\mathbf{1504_1\text{-}1504_n}$ is expected to respond to a reduction in power by sending a message instructing the wireless charging system 1502 to increase its power output through the active charging coils $\mathbf{1504_1\text{-}1504_n}$. If the receiving device 1506, 1508 does not respond with a request to increase power, the wireless charging system 1502 may determine that the receiving device 1506, 1508 is not actively coupled to the charging coils $\mathbf{1504_1\text{-}1504_n}$ for which power was reduced, and the wireless charging system 1502 may conclude that messages related to the receiving device 1506, 1508 are received through parasitic coupling. The wireless charging system 1502 may cause any charging coils $\mathbf{1504_1\text{-}1504_n}$ associated with such phantom receivers to exit the active power transfer state and return to the selection state, allowing these charging coils $\mathbf{1504_1\text{-}1504_n}$ to look for new chargeable devices.

In some implementations, multiple reductions in power are performed over a time period to improve phantom receiver detection. The reduction in power applied may be small enough to avoid adversely affect the receiver's load regulation performance, while being large enough to prompt the receiver to respond with a request to increase power.

Figure 16:
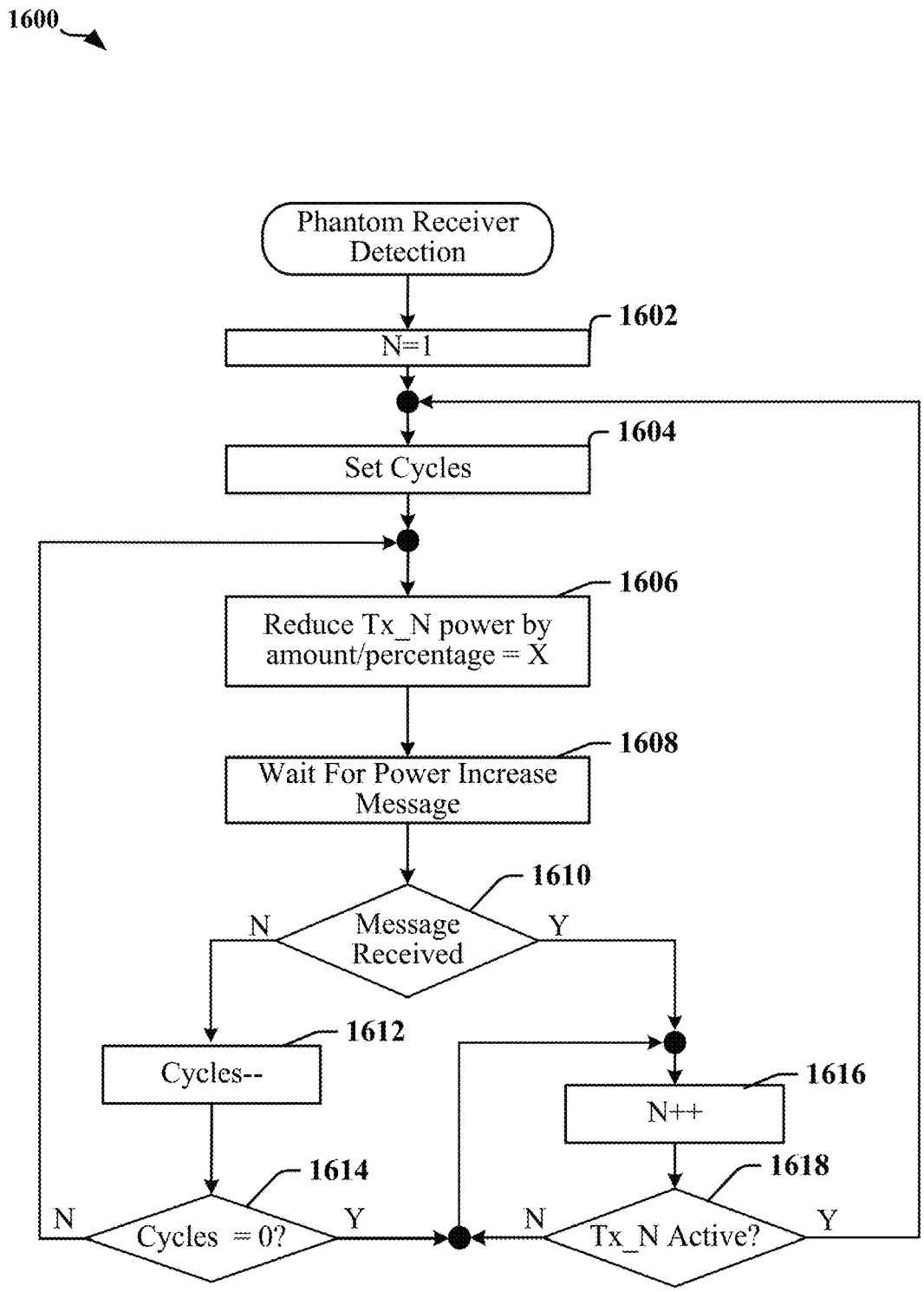
FIG. 16 is a flowchart illustrating phantom receiver detection in accordance with certain aspects disclosed herein.

FIG. 16 is a flowchart 1600 illustrating phantom receiver detection in accordance with certain aspects disclosed herein. At block 1602, a wireless charging system 1502 may initialize a coil counter that is used to index or identify a charging coil $\mathbf{1504_1\text{-}1504_n}$ to participate in a search for phantom receivers. The coil counter may count continuously such that, for example, the coil counter initially has a value of 1, counts to N and then resets to 1. In this manner a continuous check for phantom receivers may be conducted. At block 1604, the wireless charging system 1502 may initialize a cycle counter that is used to control the number of power reductions or power reduction cycles performed at each charging coil $\mathbf{1504_1\text{-}1504_n}$.

At block 1606, the wireless charging system 1502 may reduce power transmitted through a current charging coil $\mathbf{1504_1\text{-}1504_n}$, and the wireless charging system 1502 may wait for response messages at block 1608. The response message may include a request to increase power. If at block 1610, the wireless charging system 1502 determines that no response message has been received, then at block 1612, the wireless charging system 1502 may increase the cycle counter. If at block 1614, the wireless charging system 1502 determines that the maximum number of cycles has been performed, the process continues at block 1616. Otherwise, the wireless charging system 1502 may initiate a new cycle at block 1606. If at block 1610, the wireless charging system 1502 determined that a response message had been received, the process continues at block 1616.

At block 1616, the wireless charging system 1502 may increment the coil counter to select a next charging coil $\mathbf{1504_1\text{-}1504_n}$ to receive a reduction in power. At block 1618, the wireless charging system 1502 may determine that the next selected charging coil $\mathbf{1504_1\text{-}1504_n}$ and the process may return to block 1616. Otherwise, the process returns to block 1604.

Example of a Processing Circuit

Figure 17:
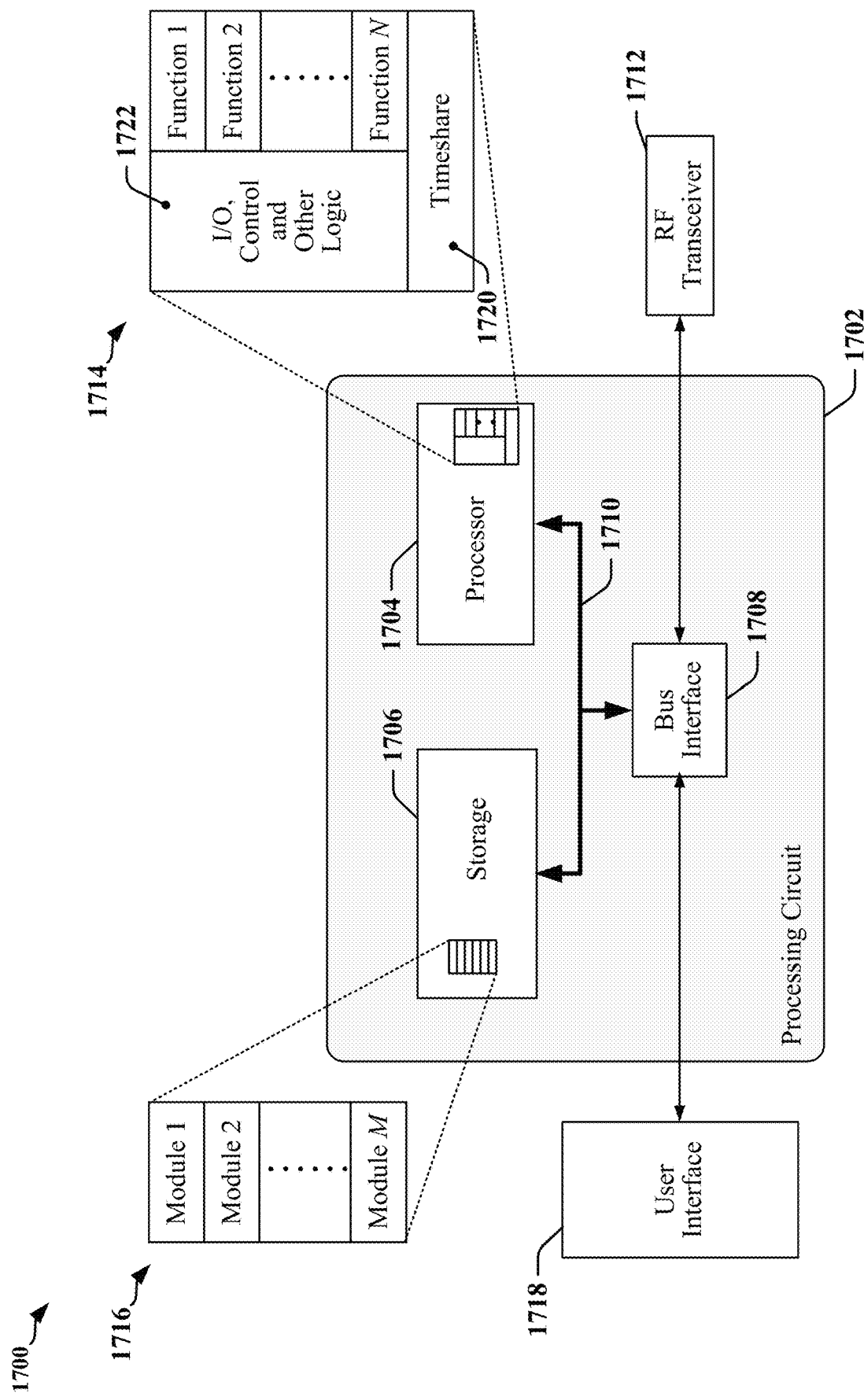
FIG. 17 illustrates one example of an apparatus employing a processing circuit that may be adapted according to certain aspects disclosed herein.

FIG. 17 is a diagram illustrating an example of a hardware implementation for an apparatus 1700 that may be incorporated in a charging device or in a receiving device that enables a battery to be wirelessly charged. In some examples, the apparatus 1700 may perform one or more functions disclosed herein. In accordance with various aspects of the disclosure, an element, or any portion of an element, or any combination of elements as disclosed herein may be implemented using a processing circuit 1702. The processing circuit 1702 may include one or more processors 1704 that are controlled by some combination of hardware and software modules. Examples of processors 1704 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1704 may include specialized processors that perform specific functions, and that may be configured, augmented or controlled by one of the software modules 1716. The one or more processors 1704 may be configured through a combination of software modules 1716 loaded during initialization, and further configured by loading or unloading one or more software modules 1716 during operation.

In the illustrated example, the processing circuit 1702 may be implemented with a bus architecture, represented generally by the bus 1710. The bus 1710 may include any number of interconnecting buses and bridges depending on the specific application of the processing circuit 1702 and the overall design constraints. The bus 1710 links together various circuits including the one or more processors 1704, and storage 1706. Storage 1706 may include memory devices and mass storage devices, and may be referred to herein as computer-readable media and/or processor-readable media. The storage 1706 may include transitory storage media and/or non-transitory storage media. The bus 1710 may also link various other circuits such as timing sources, timers, peripherals, voltage regulators, and power management circuits. A bus interface 1708 may provide an interface between the bus 1710 and one or more transceivers 1712. In one example, a transceiver 1712 may be provided to enable the apparatus 1700 to communicate with a charging or receiving device in accordance with a standards-defined protocol. Depending upon the nature of the apparatus 1700, a user interface 1718 (e.g., keypad, display, speaker, microphone, joystick) may also be provided, and may be communicatively coupled to the bus 1710 directly or through the bus interface 1708.

A processor 1704 may be responsible for managing the bus 1710 and for general processing that may include the execution of software stored in a computer-readable medium that may include the storage 1706. In this respect, the processing circuit 1702, including the processor 1704, may be used to implement any of the methods, functions and techniques disclosed herein. The storage 1706 may be used for storing data that is manipulated by the processor 1704 when executing software, and the software may be configured to implement any one of the methods disclosed herein.

One or more processors 1704 in the processing circuit 1702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1706 or in an external computer-readable medium. The external computer-readable medium and/or storage 1706 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1706 may also include, by way of example, a carrier wave, a transmission line, and any other suitable medium for transmitting software and/or instructions that may be accessed and read by a computer. Computer-readable medium and/or the storage 1706 may reside in the processing circuit 1702, in the processor 1704, external to the processing circuit 1702, or be distributed across multiple entities including the processing circuit 1702. The computer-readable medium and/or storage 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1706 may maintain software maintained and/or organized in loadable code segments, modules, applications, programs, etc., which may be referred to herein as software modules 1716. Each of the software modules 1716 may include instructions and data that, when installed or loaded on the processing circuit 1702 and executed by the one or more processors 1704, contribute to a run-time image 1714 that controls the operation of the one or more processors 1704. When executed, certain instructions may cause the processing circuit 1702 to perform functions in accordance with certain methods, algorithms and processes described herein, including the methods illustrated in FIGS. 7, 16 and 18.

Some of the software modules 1716 may be loaded during initialization of the processing circuit 1702, and these software modules 1716 may configure the processing circuit 1702 to enable performance of the various functions disclosed herein. For example, some software modules 1716 may configure internal devices and/or logic circuits 1722 of the processor 1704, and may manage access to external devices such as a transceiver 1712, the bus interface 1708, the user interface 1718, timers, mathematical coprocessors, and so on. The software modules 1716 may include a control program and/or an operating system that interacts with interrupt handlers and device drivers, and that controls access to various resources provided by the processing circuit 1702. The resources may include memory, processing time, access to a transceiver 1712, the user interface 1718, and so on.

One or more processors 1704 of the processing circuit 1702 may be multifunctional, whereby some of the software modules 1716 are loaded and configured to perform different functions or different instances of the same function. The one or more processors 1704 may additionally be adapted to manage background tasks initiated in response to inputs from the user interface 1718, the transceiver 1712, and device drivers, for example. To support the performance of multiple functions, the one or more processors 1704 may be configured to provide a multitasking environment, whereby each of a plurality of functions is implemented as a set of tasks serviced by the one or more processors 1704 as needed or desired. In one example, the multitasking environment may be implemented using a timesharing program 1720 that passes control of a processor 1704 between different tasks, whereby each task returns control of the one or more processors 1704 to the timesharing program 1720 upon completion of any outstanding operations and/or in response to an input such as an interrupt. When a task has control of the one or more processors 1704, the processing circuit is effectively specialized for the purposes addressed by the function associated with the controlling task. The timesharing program 1720 may include an operating system, a main loop that transfers control on a round-robin basis, a function that allocates control of the one or more processors 1704 in accordance with a prioritization of the functions, and/or an interrupt driven main loop that responds to external events by providing control of the one or more processors 1704 to a handling function.

In certain implementations, the apparatus 1700 includes or operates as a wireless charging device that has a battery charging power source coupled to one or more charging circuits, a plurality of charging cells and a controller, which may be included in the one or more processors 1704. The plurality of charging cells may be configured to provide a charging surface. At least one coil may be configured to direct an electromagnetic field through a charge transfer area of each charging cell while charging a device placed on the charging surface.

In one implementation, the charging device includes a plurality of charging circuits, each charging circuit including a transmitting coil and a capacitor coupled at a node, a driver circuit configurable to provide a charging current to one or more charging circuit in the plurality of charging circuits, and a controller. The controller may be configured to cause a first pulse to be transmitted through each of the plurality of charging circuits and to determine peak voltage at each of the nodes in the plurality of charging circuits, where the peak voltage at each node is responsive to the first pulse and indicative of a coupling coefficient with a receiving coil in a chargeable device. The controller may be configured to determine that a minimum peak voltage responsive to the first pulse is associated with a first charging circuit in the plurality of charging circuits, and to configure the driver circuit to provide a first charging current to the first charging circuit.

In some implementations, the controller is further configured to detect that voltage at the node in the first charging circuit exceeds a threshold voltage while providing the first charging current to the first charging circuit, cause a second pulse to be transmitted through one or more other charging circuits in the plurality of charging circuits, determine that a minimum peak voltage responsive to the second pulse is associated with a second charging circuit in the plurality of charging circuits, and configure the driver circuit to provide a second charging current to the second charging circuit. In some instances, the controller may configure the driver circuit to discontinue the first charging current when providing the second charging current to the second charging circuit. In some instances, the controller may configure the driver circuit to redirect at least a portion of the first charging current to the second charging circuit as the second charging current.

In some implementations, the controller may configure the driver circuit to reduce the first charging current after detecting that voltage at the node in the first charging circuit exceeds a threshold voltage while providing the first charging current to the first charging circuit, configure the driver circuit to increase the first charging current when a message requesting power increase is received from the chargeable device, and configure the driver circuit to discontinue the first charging current when the message requesting power increase is not received from the chargeable device. In some examples, the charging device may include an ASK demodulator configured to decode the message requesting power increase from a signal received through the first charging circuit.

In some implementations, the controller is further configured to determine that a chargeable device is located proximate to at least one transmitting coil associated with the plurality of charging circuits. The first pulse may be transmitted responsive to determination of proximity of the chargeable device. The controller may be further configured to detect an increase in voltage at the node in the first charging circuit while providing the first charging current to the first charging circuit, and determine that location of the chargeable device has changed when the voltage at the node in the first charging circuit exceeds a threshold voltage.

The storage 1706 may include a processor-readable storage medium that has instructions stored thereon which, when executed by at least one processor of a charging circuit, cause the charging circuit to transmit a first pulse through each of a plurality of charging circuits, determine peak voltage at nodes in the plurality of charging circuits, each node coupling a transmitting coil to a capacitor in one charging circuit in the plurality of charging circuits, the peak voltage at each node being responsive to the first pulse and indicative of a coupling coefficient with a receiving coil in a chargeable device, determine that a minimum peak voltage responsive to the first pulse is associated with a first charging circuit in the plurality of charging circuits, and provide a first charging current to the first charging circuit.

The processor-readable storage medium may include instructions that cause the charging circuit to detect that voltage at the node in the first charging circuit exceeds a threshold voltage while providing the first charging current to the first charging circuit, transmit a second pulse through one or more other charging circuits in the plurality of charging circuits, determine that a minimum peak voltage responsive to the second pulse is associated with a second charging circuit in the plurality of charging circuits, and provide a second charging current to the second charging circuit. The processor-readable storage medium may include instructions that cause the charging circuit to redirect at least a portion of the first charging current to the second charging circuit as the second charging current.

The processor-readable storage medium may include instructions that cause the charging circuit to reduce the first charging current after detecting that voltage at the node in the first charging circuit exceeds a threshold voltage while providing the first charging current to the first charging circuit, increase the first charging current when a message requesting power increase is received from the chargeable device, and discontinue the first charging current when the message requesting power increase is not received from the chargeable device.

Figure 18:
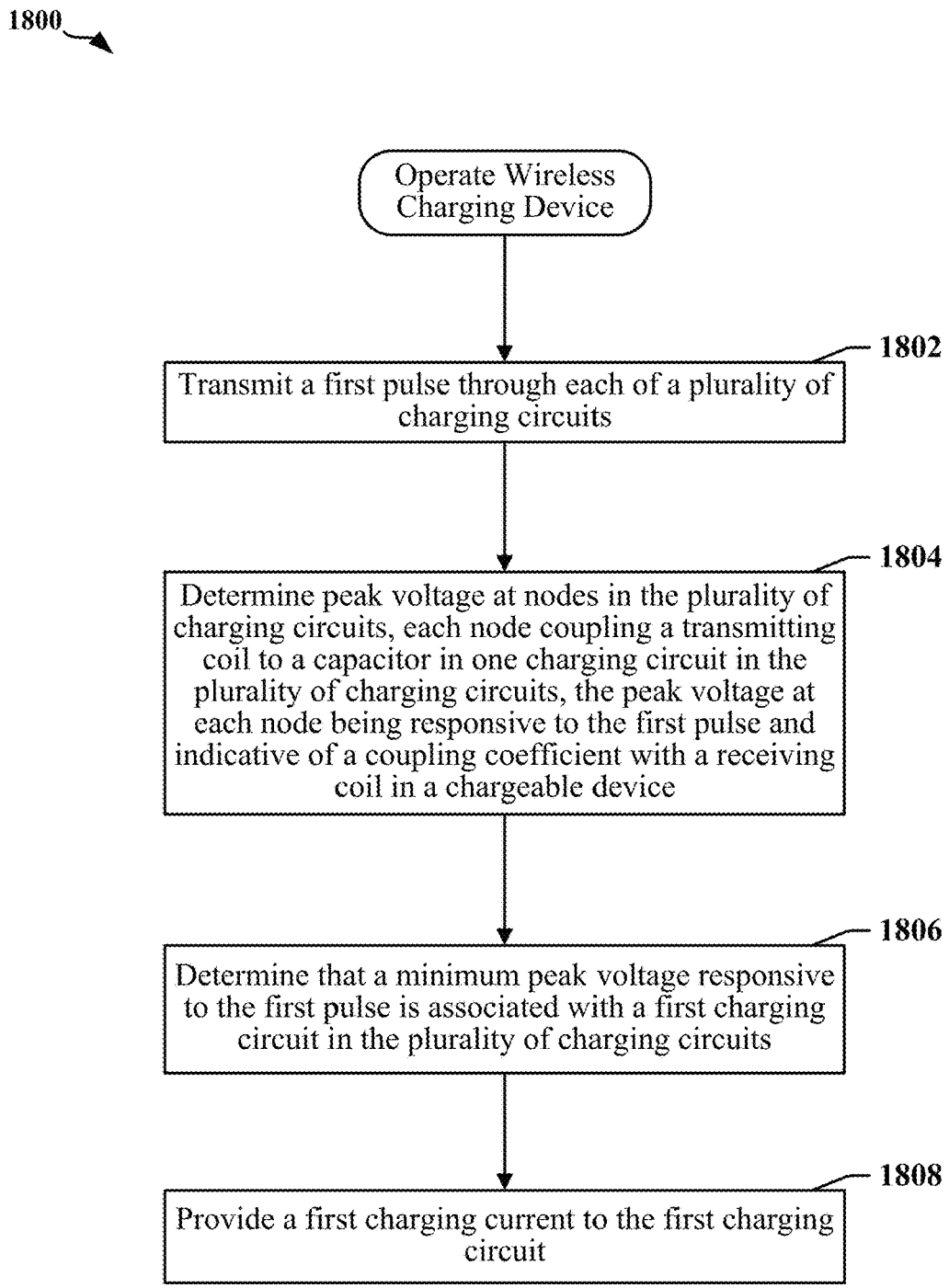
FIG. 18 is a flowchart illustrating a method for operating a wireless charging device in accordance with certain aspects disclosed herein.

FIG. 18 is a flowchart 1800 illustrating a method for operating a wireless charging device. The method may be performed or managed by a controller in the wireless charging device. At block 1802, the method includes transmitting a first pulse through each of a plurality of charging circuits. A driver circuit may be configured to provide the first pulses and other such pulses. In one example, the pulses may include a partial cycle of an AC current produced by the driver circuit. In another example, the pulses may include multiple cycle of an AC current produced by the driver circuit. In another example, the pulses may be step pulses produced by the driver circuit or another circuit.

At block 1804, the method proceeds by determining peak voltage at nodes in the plurality of charging circuits. Each node may be coupled to or may couple a transmitting coil to a capacitor in one of the charging circuits in the plurality of charging circuits. The voltage measured at the node may be a tank voltage. The peak voltage measured at each node responsive to the first pulse may indicate a coupling coefficient with respect to a receiving coil in a chargeable device. For example, the coupling coefficient may characterize the coupling between the transmitting coil in the charging circuit and a receiving coil in a chargeable device.

At block 1806, the method continues by determining which of the measured nodes provides the minimum peak voltage responsive to the first pulse. The minimum peak voltage may be associated with a first charging circuit in the plurality of charging circuits. At block 1808, the method proceeds by providing a first charging current to the first charging circuit. The minimum peak voltage may indicate the best coupling between a transmitting coil and the receiving coil in the chargeable device. For example, the peak voltage at each node may be representative of a leakage inductance of a charging circuit associated with each node.

In certain implementations, the method includes detecting that voltage at the node in the first charging circuit exceeds a threshold voltage while providing the first charging current to the first charging circuit, transmitting a second pulse through one or more other charging circuits in the plurality of charging circuit, determining that a minimum peak voltage responsive to the second pulse is associated with a second charging circuit in the plurality of charging circuits, and providing a second charging current to the second charging circuit. In some implementations, the voltage at the node in the first charging circuit is monitored while the first charging current is provided to the first charging circuit charging in order to determine when the chargeable device is moved. An increase in the voltage at the node may indicate movement when the change is sufficiently great. In one example, the method includes discontinuing the first charging current when providing the second charging current to the second charging circuit. In another example, the method includes redirecting at least a portion of the first charging current to the second charging circuit as the second charging current.

In certain implementations, the method includes reducing the first charging current after detecting that voltage at the node in the first charging circuit exceeds a threshold voltage while providing the first charging current to the first charging circuit, increasing the first charging current when a message requesting power increase is received from the chargeable device, and discontinuing the first charging current when the message requesting power increase is not received from the chargeable device. In some implementations, the voltage at the node in the first charging circuit is monitored while the first charging current is provided to the first charging circuit charging in order to determine when the chargeable device is moved. An increase in the voltage at the node may indicate movement when the change is sufficiently great. The decrease in the first charging current may cause the chargeable device to detect a drop in power transfer. The chargeable device may then request an increase in power transfer. The method may include decoding the message from the chargeable device requesting power increase from an amplitude shift keyed signal received through the first charging circuit.

In certain implementations, the method includes determining that a chargeable device is located proximate to at least one transmitting coil associated with the plurality of charging circuits, wherein the first pulse is transmitted responsive to determination of proximity of the chargeable device. The method may include detecting an increase in voltage at the node in the first charging circuit while providing the first charging current to the first charging circuit, and determining that location of the chargeable device has changed when the voltage at the node in the first charging circuit exceeds a threshold voltage.

Each node may couple a charging coil to a capacitor in one of the plurality of charging circuits. In some examples, for each node measured in the plurality of charging circuits, peak voltage level is representative of a leakage inductance associated with a charging coil of the corresponding charging circuit.

In certain examples, the first charging circuit includes a first node with lowest peak voltage level of the nodes in the plurality of charging circuits. The method may include receiving one or more messages through the first charging circuit while the first charging current is being provided to the first charging circuit, obtaining a second measurement of peak voltage level at the first node, and discontinuing the first charging current when the second measurement of peak voltage level is greater than the lowest peak voltage level of the nodes.

In some instances, the method includes determining that a chargeable device is proximate to at least one charging coil associated with the plurality of charging circuit. The energy pulse may be transmitted through each of the plurality of charging circuits responsive to determination of proximity of the chargeable device.

In certain examples, the first charging circuit is inductively coupled to a chargeable device and the first charging circuit includes a first node with lowest measured peak voltage level in the first measurements of peak voltage levels. The method may include determining that the chargeable device has been moved while the first charging current is being provided to the first charging circuit, obtaining second measurements of peak voltage levels at nodes in one or more charging circuits. Each node in the in one or more charging circuits may couple a charging coil to a capacitor in the one or more charging circuits. The method may include providing a second charging current to a second charging circuit selected from the plurality of charging circuits based on a comparison of the second measurements of peak voltage levels. The second charging circuit may be different from the first charging current. Determining that the chargeable device has been moved may include obtaining second measurements of peak voltage levels at the nodes in the plurality of charging circuits, and determining that peak voltage level at the first node has increased. Providing a second charging current may include discontinuing the first charging current and/or redirecting at least a portion of the first charging current to the second charging circuit.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for operating a wireless charging device, comprising:
   transmitting a first pulse through a first power transmitting coil that is coupled to a first capacitor at a first node in a first charging circuit;
   determining a first peak voltage, wherein the first peak voltage occurs at the first node in response to the first pulse and is indicative of a coupling coefficient between the first power transmitting coil and a receiving coil in a chargeable device;

transmitting the first pulse through a second power transmitting coil that is coupled to a second capacitor at a second node in a second charging circuit;

determining a second peak voltage, wherein the second peak voltage occurs at the second node in response to the first pulse and is indicative of a coupling coefficient between the second power transmitting coil and the receiving coil in the chargeable device;

determining that amplitude of the first peak voltage is lower than amplitude of the second peak voltage; and providing a first charging current to the first charging circuit.

2. The method of claim 1, wherein the first peak voltage is representative of a leakage inductance of the first charging circuit.

3. The method of claim 1, wherein the first power transmitting coil and the second power transmitting coil are deployed adjacent to a surface of the charging device.

4. The method of claim 1, further comprising:
transmitting the first pulse through a third power transmitting coil that is coupled to a third capacitor at a third node in a third charging circuit;
determining a third peak voltage, wherein the third peak voltage occurs at the third node in response to the first pulse and is indicative of a coupling coefficient between the third power transmitting coil and the receiving coil in the chargeable device; and
providing the first charging current to the first charging circuit when the first peak voltage is lower than the amplitude of the second peak voltage and lower than the amplitude of the third peak voltage.

5. The method of claim 4, further comprising:
detecting that voltage at the node in the first charging circuit exceeds a threshold voltage while providing the first charging current to the first charging circuit;
transmitting a second pulse through each of the second charging circuit and the third charging circuit;
determining that a minimum peak voltage responsive to the second pulse is associated with the second charging circuit; and
providing a second charging current to the second charging circuit.

6. The method of claim 5, further comprising:
discontinuing the first charging current when providing the second charging current to the second charging circuit.

7. The method of claim 5, further comprising:
redirecting at least a portion of the first charging current to the second charging circuit as the second charging current.

8. The method of claim 5, further comprising:
redirecting at least a portion of the first charging current to the third charging circuit when providing the second charging current to the second charging circuit.

9. A non-transitory processor-readable storage medium having instructions stored thereon which, when executed by at least one processor of a charging circuit, cause the charging circuit to:
transmit a first pulse through a first power transmitting coil that is coupled to a first capacitor at a first node in a first charging circuit;

determine a first peak voltage, wherein the first peak voltage occurs at the first node in response to the first pulse and is indicative of a coupling coefficient between the first power transmitting coil and a receiving coil in a chargeable device;

transmit the first pulse through a second power transmitting coil that is coupled to a second capacitor at a second node in a second charging circuit;

determine a second peak voltage, wherein the second peak voltage occurs at the second node in response to the first pulse and is indicative of a coupling coefficient between the second power transmitting coil and the receiving coil in the chargeable device;

determine that amplitude of the first peak voltage is lower than amplitude of the second peak voltage; and provide a first charging current to the first charging circuit.

10. The processor-readable storage medium of claim 9, wherein the first peak voltage is representative of a leakage inductance of the first charging circuit.

11. The processor-readable storage medium of claim 9, wherein the first power transmitting coil and the second power transmitting coil are deployed adjacent to a surface of the charging device.

12. The processor-readable storage medium of claim 9, wherein the instructions cause the charging circuit to:
transmit the first pulse through a third power transmitting coil that is coupled to a third capacitor at a third node in a third charging circuit;
determine a third peak voltage, wherein the third peak voltage occurs at the third node in response to the first pulse and is indicative of a coupling coefficient between the third power transmitting coil and the receiving coil in the chargeable device; and
provide the first charging current to the first charging circuit when the first peak voltage is lower than the amplitude of the second peak voltage and lower than the amplitude of the third peak voltage.

13. The processor-readable storage medium of claim 12, wherein the instructions cause the charging circuit to:
detect that voltage at the node in the first charging circuit exceeds a threshold voltage while providing the first charging current to the first charging circuit;
transmit a second pulse through each of the second charging circuit and the third charging circuit;
determine that a minimum peak voltage responsive to the second pulse is associated with the second charging circuit; and
provide a second charging current to the second charging circuit.

14. The processor-readable storage medium of claim 13, wherein the instructions cause the charging circuit to:
discontinue the first charging current when providing the second charging current to the second charging circuit.

15. The processor-readable storage medium of claim 13, wherein the instructions cause the charging circuit to:
redirect at least a portion of the first charging current to the second charging circuit as the second charging current.

16. The processor-readable storage medium of claim 13, wherein the instructions cause the charging circuit to:
redirect at least a portion of the first charging current to the third charging circuit when providing the second charging current to the second charging circuit.

* * * * *